(12) United States Patent
Avery

(10) Patent No.: US 7,624,887 B2
(45) Date of Patent: Dec. 1, 2009

(54) REUSABLE TRANSPORT PACKAGING

(75) Inventor: Donald J. Avery, Chesterfield, MO (US)

(73) Assignee: D.J. Avery Group, Inc., Chesterfield, MO (US)

( * ) Notice: Subject to any disclaimer, the term of this patent is extended or adjusted under 35 U.S.C. 154(b) by 0 days.

(21) Appl. No.: 11/897,562

(22) Filed: Aug. 31, 2007

(65) Prior Publication Data

US 2008/0073341 A1 Mar. 27, 2008

Related U.S. Application Data

(60) Provisional application No. 60/841,764, filed on Sep. 1, 2006.

(51) Int. Cl.
*A45C 7/00* (2006.01)
*A45C 13/04* (2006.01)
*A45C 13/26* (2006.01)

(52) U.S. Cl. .......................... 220/9.2; 220/9.4; 220/668

(58) Field of Classification Search ..................... 220/6, 220/7, 9.2–9.4, 23.4, 495.08, 668; 206/504, 206/512

See application file for complete search history.

(56) References Cited

U.S. PATENT DOCUMENTS

| | | | |
|---|---|---|---|
| 918,039 | A | 4/1909 | Grundmann |
| 1,108,289 | A | 8/1914 | Weiss |
| 1,206,618 | A | 11/1916 | Thrasher |
| 1,587,809 | A | 6/1926 | Walker |
| 2,411,121 | A | 11/1946 | Wilson |
| 2,688,420 | A | 9/1954 | Bishop et al. |
| 2,778,560 | A | 1/1957 | Phfeiffer |
| 2,868,406 | A * | 1/1959 | Kookogey ....................... 220/7 |
| 2,941,710 | A | 6/1960 | Smith |
| 2,961,117 | A | 11/1960 | Hutton |
| 3,499,398 | A * | 3/1970 | Murray ....................... 108/53.5 |
| 3,557,855 | A * | 1/1971 | Weingarten et al. ......... 206/386 |
| 3,599,824 | A * | 8/1971 | Pneuman et al. ........... 220/23.4 |
| 3,853,227 | A | 12/1974 | Filipowski |

(Continued)

*Primary Examiner*—Harry A Grosso
(74) *Attorney, Agent, or Firm*—Greensfelder, Hemker & Gale, P.C.; Peter S. Gilster

(57) ABSTRACT

Transport packaging, capable of being erected or folded, and when erected serving as a shipper for commercial packaging of goods. The packaging is defined by a structural framework [100] capable of carrying a sheath, film wrap or cover, or other materials of vessel-forming character to hold and protect products to be transported within the framework. The framework when erected provides contents-receptive configuration to protect the packing and its contents against the stresses of filling, storage, distribution, merchandising and use of the packaging. The framework has a plurality of horizontal and vertical members [102, 103, 105, 106, 107, 108, 110, 111], wherein horizontal members define lengthwise structural elements and the vertical members define upright structural elements, together defining an exoskeleton having windowed open frame panels of the framework joined pivotally at lower and fixedly/securely at upper corners defined by the upright structural elements. At each of the lower corners is a shiftable stabilizer [123], selectively securing the horizontal and vertical elements on each lower corner in stabilized, locked, relationship when the framework is erected, but the stabilizers each being selectively shiftable from stabilizing position to permit the frame to fold into or out of an unerected condition so it can be returned to a location for being refilled with contents, so as to be sustainably capable of reuse many times. The framework also provides for stacking/nesting and securement together of tiers of the new transport packages.

22 Claims, 13 Drawing Sheets

U.S. PATENT DOCUMENTS

| | | |
|---|---|---|
| 4,053,245 A | 10/1977 | Wright |
| 4,173,289 A | 11/1979 | Nesti |
| 4,342,397 A | 8/1982 | Halstrick |
| 4,584,806 A | 4/1986 | Graham, Jr. |
| 4,585,159 A | 4/1986 | Travis |
| 4,762,222 A | 8/1988 | Martin |
| 4,982,872 A | 1/1991 | Avery |
| 5,143,283 A | 9/1992 | Lancaster |
| 5,170,895 A | 12/1992 | Chudzik |
| 5,358,125 A | 10/1994 | Blessing |
| 5,415,311 A | 5/1995 | Coogan |
| 5,474,197 A | 12/1995 | Hillis et al. |
| 5,573,176 A | 11/1996 | Applegate |
| 5,595,051 A | 1/1997 | Applegate |
| 5,815,903 A | 10/1998 | Foster et al. |
| 5,875,910 A | 3/1999 | Scelsa |
| 5,975,325 A | 11/1999 | Wallace |
| 6,027,290 A | 2/2000 | Andre |
| 6,082,571 A | 7/2000 | Avery |
| 6,409,076 B1 | 6/2002 | Wang |
| 6,520,364 B2 * | 2/2003 | Spykerman et al. ............ 220/6 |
| 6,866,160 B2 * | 3/2005 | Wang et al. .................... 220/7 |
| 6,953,125 B2 | 10/2005 | Mingot et al. |

* cited by examiner

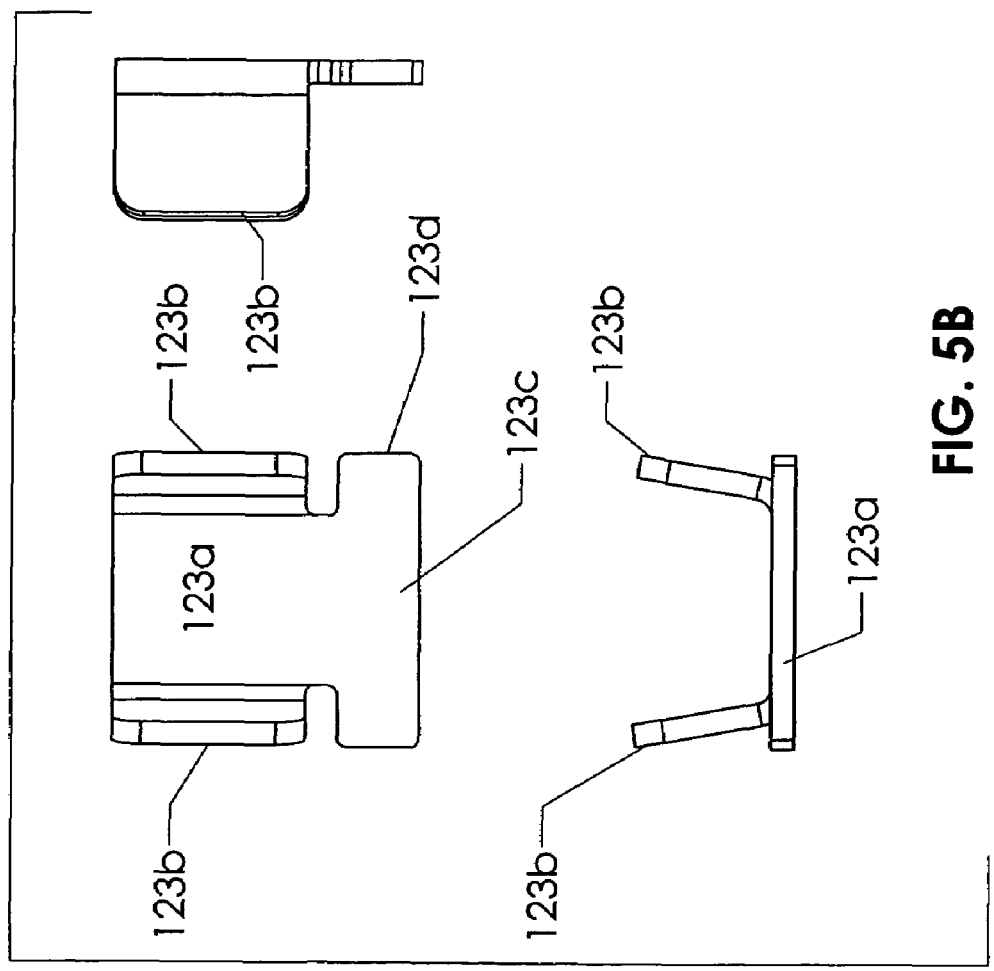
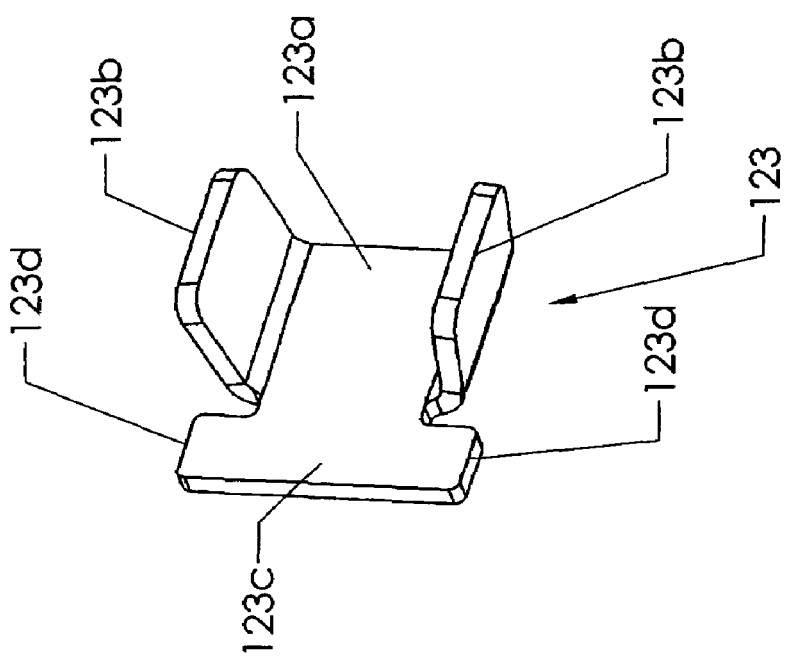
FIG. 5B
FIG. 5A

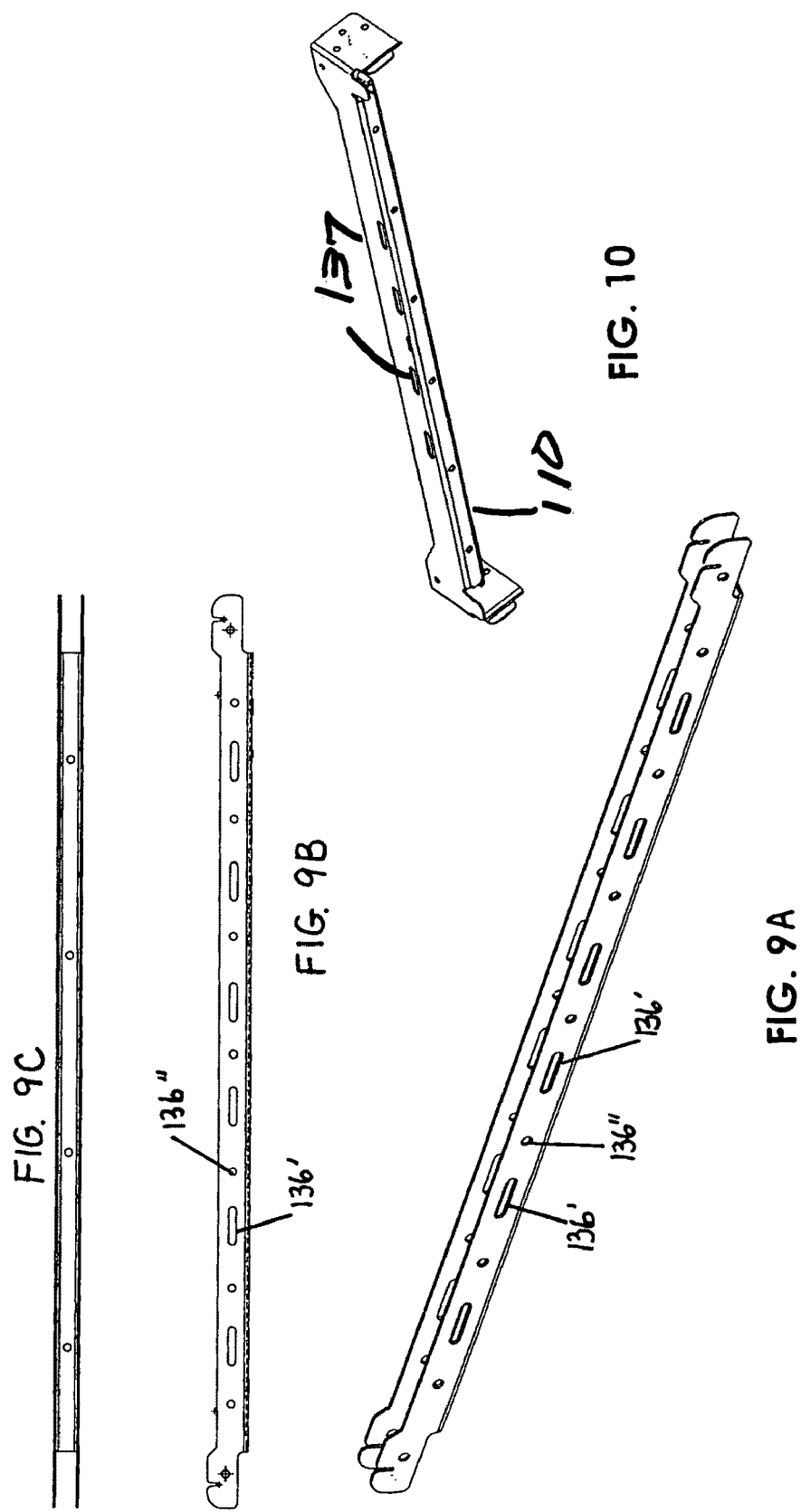

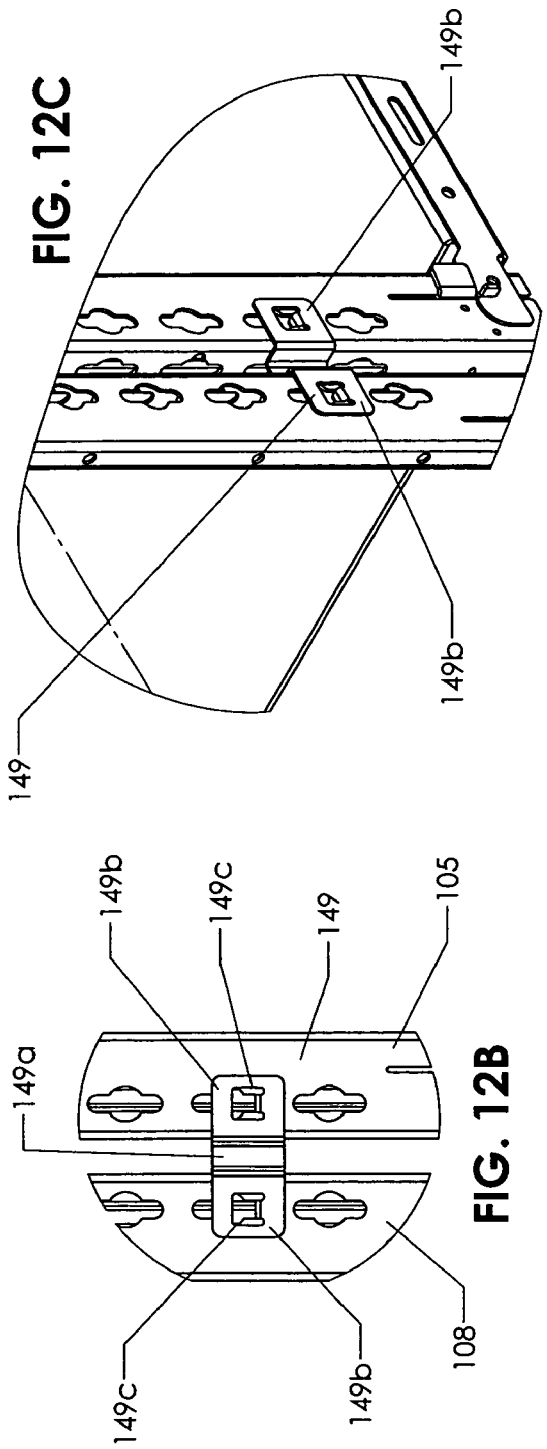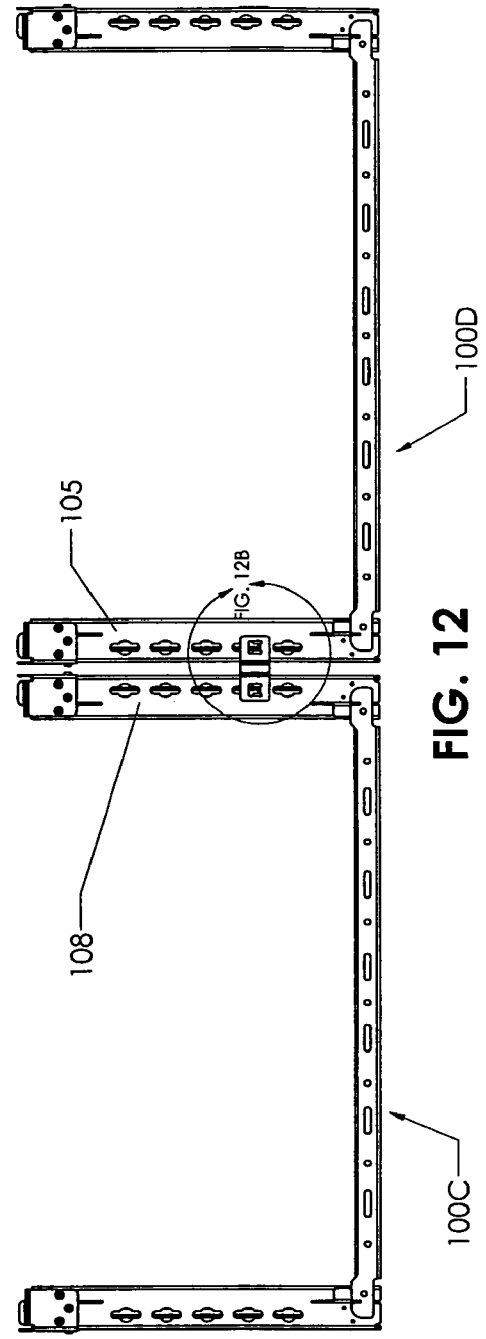

REUSABLE TRANSPORT PACKAGING

CROSS REFERENCE TO RELATED PATENT APPLICATION(S)

This application is based upon and claims the priority of provisional patent application Ser. No. 60/841,764 entitled REUSABLE TRANSPORT PACKAGING of the present inventor, Donald J. Avery, filed Sep. 1, 2006, and incorporated herein by reference.

BACKGROUND OF THE INVENTION

The invention relates to reusable transport packaging, capable of being erected or folded, and when erected serving as a shipper, that is, a container or package for commercial packaging and shipping of goods, such as for original shipping of the goods in commerce or for other purposes, and for reshipping, with low environmental impact as well as reusability. In addition to its novel aspect as a reusable transport packaging as a shipper it uses novel fastener-stabilizers components enabling erecting for use in shipping and containerization and for permitting rapid folding when the new structure is not in use, as during return to a packager or other shipper of goods. The term "shipper" is used herein for convenience and is used in a broad sense without ruling out the possibility that the new packaging herein described can be used for purposes other than shipping, such as for the storage or inventorying of goods, and without ruling out the possibility that the shipper may itself be used in groups, stacks and/or tiers, or may be incorporated into still larger packaging, as on pallets or for incorporation into larger vessels, such as ISO containers.

The packaging industry is known to seek what could be called a "sustainable" package or container, as for transport of goods. Sustainable packaging, in the form of transport containers, necessitates finding devices, constructions and materials that 1) are reusable; 2) are plentiful; and 3) may be replenished by growth or reprocessing. Cardboard boxes are a very common shipping means today, but cardboard or other cellulosic shipping containers can be reused only to a very limited extent, e.g., up to about three times. Cardboard loses about 50% of its strength in conditions of high humidity and temperature. Degradation of reprocessed cardboard or cellulosic shipping materials used in packaging is evident in shipments worldwide.

Previous patents of the present inventor, Donald J. Avery, include U.S. Pat. No. 6,082,571, entitled Sheath-Structure Container and Method for Manufacturing Thereof, which patent is incorporated herein by reference, have successfully addressed needs of the packaging industry. Other patents of Donald J. Avery having general relevance and utility in the field are U.S. Pat. Nos. 5,573,176 and 5,595,051, which were originally issued naming as inventory one Steven S. Applegate but by correction of inventorship, evidenced by Certificate of Correction, the true inventor in each is Donald J. Avery. Those patents are also incorporated herein by reference. Showing materials useful in the construction of the present invention is U.S. Pat. No. 4,982,872, of Donald J. Avery, which patent also is incorporated herein by reference.

Disclosed in the mentioned patent Avery U.S. Pat. No. 6,082,571 is a recyclable or environmentally protective and economical container that is useful for commercial packaging of goods so as to protect the goods against stresses of filling, storage, distribution, merchandising and use of the container. As disclosed in that patent, it has a structural framework and a sheath conforming to at least portions of the framework. The framework has horizontal and vertical members, which define lengthwise and upright structural elements forming frame panels of open character, as in the character of picture frames, the elements being joined at corners provided by the upright elements. There may be as few as least one lengthwise structural element of each panel with at least one vertical element at each corner to provide an essentially skeletonized structure. The structural elements are of recyclable and/or reusable structural material and configuration as will provide the container with a strength which is at least about 80-85% of the strength of a non-windowed container of such structural material. The sheath has barrier properties to enclose the goods therein in protected relationship. The horizontal and vertical members are joined in mutually perpendicular relation define respective rectangular panels and with the panels being joined in side-by-side relation as an array of panels corresponding to intended container walls which array is folded into a closed configuration to complete the framework. The horizontal and vertical members do not fold. The framework is not intended to be folded or collapsed but the structural material is reusable.

It is desirable and advantageous to allow ease of a skeletonized framework to be used again for packaging. The present invention allows easy and rapid folding of the framework after use, so as to provide a flattened framework that takes up little space. Many folded frameworks of the invention can be stacked or stored and easily sent back to a shipper. The novel fastener-stabilizer components ("stabilizers" herein) of the invention allow the folded framework to be quickly erected for use in shipping and containerization, and used then again and again reliably, with long-lasting capability, for shipping of goods again and again.

SUMMARY OF THE INVENTION

Briefly, transport packaging of the present invention comprises at least in part a frame or framework, of metal or other materials, which is reusable preferably at least thirty to fifty times or more and can be readily made using available techniques and materials. Such materials are inexpensive and plentiful on the planet, and allow the use of available structural materials and available films and fabrics, including mesh materials as well as combinations of meshes with other materials, the films or fabrics being porous or nonporous, to provide vessel-defining additional component features of the new transport package or shipper. The fabrics can be made of such materials as nylon, polyester, or combinations thereof, as well as natural materials such as cotton which are not like the petroleum-based films, but which can substitute for, or alternatively be used interchangeably with petroleum-based films or other synthetic material or other materials derived from natural or modified materials. The films and fabrics can be recycled or reprocessed. The new transport shippers avoid entirely the problems of damage to shipping materials which are so characteristic of the prior art, especially in paper-containing containers, as they are not troubled by high heat or humidity, structural strength is maintained throughout the lifetime of the product, and yet with all of the strength and convenience, the units can be folded flat and stacked and thus sent back for reuse again and again.

The frame has vertical and horizontal members, there being preferably four vertical members, a pair of oppositely disposed upper end horizontal members fixedly connected to upper ends of pairs of the vertical members, and a pair of horizontal members pivotally connected to and interengaging lower ends of another pair of the vertical members and defining pivots at lower ends of the vertical members.

There is provision to selectively stabilize or destabilize the pivots, the frame being capable of being erected into an upright configuration for carrying contents when the pivots are stabilized, and the frame being capable of being collapsed into a folded space-conserving configuration for storage, return shipment or future use when the pivots are destabilized.

The frame when erected forms an exoskeleton of open panels wherein the upper horizontal members are mutually perpendicular to the lower end horizontal members, there being preferably only two upper horizontal members and two lower horizontal members.

The frame includes stacking structure atop the vertical members to engage a like reusable transport packaging apparatus next above the claimed reusable transport packaging apparatus for stacking thereof.

The frame is adapted for carrying flexible vessel-defining material for extending over and covering at least some of said panels so as to at least partly enclose contents within the frame when erected.

Each of the vertical and horizontal members has a high aspect ratio such the length dimension of each is generally greater than any transverse dimension thereof.

The frame is capable of being erected or folded, and when erected serving as the framework of a shipper or what may simply be referred to in this description as a shipping container for commercial packaging of goods, such as for original shipping of the goods in commerce or for other purposes, and for reshipping, with low environmental impact as well as re-usability for commercial packaging of goods. The shipper protects against the stresses of filling, storage, distribution, merchandising and consumer use of the shipper.

The inventive new shipper as most preferably constructed comprises, in combination, a structural framework, here referred to as a frame or framework, which can be provided with a sheath or film wrap or cover, of polymer such as nylon or polyester or other materials as described above and in greater detail in this description, for conforming to portions of the framework, and vessels which hold and protect products to be transported. The framework when erected provides a contents-receptive configuration of the shipper and protects the shipper and its contents against the stresses noted hereinabove.

Pivotal connections between the upright, or vertical, members and the horizontal members, also referred to as base members, are capable of being stabilized or destabilized. An inventive stabilizing structural element, referred as a stabilizer, accordingly secures the horizontal and vertical elements on each corner in a predetermined relationship when the framework is erected. When the stabilizer is shifted from engagement with slots in the vertical and horizontal elements, the framework end panels of the shipper frame can fold into or out of the shipper into a flat configuration. The structural elements define, for at least a plurality of such panels, respective windows therein to provide an essentially skeletonized structural. It is, in effect, an exoskeleton.

The structural elements of the new shipper frame are of such structural material (preferably metal but other materials may be used) and configuration (slotted, angular cross-section) as will provide the shipper with a strength which is at least about 80-85% or more of the strength of a non-windowed container of such structural material. The structural material may be of recyclable and/or reusable character thus permitting reuse and/or recycling thereof for subsequent use and reincorporation in subsequent generations of shippers. The framework elements can have similar or dissimilar materials. The sheath and/or vessels can be of flexible, semi-rigid, or rigid construction of similar or dissimilar materials. When erected, the structural members are strongly and reliably secured together by the stabilizers, and the new shippers having such a framework are so strong that they can be stacked many tiers high in mated, secure relationship. The sheath or sheath components, if present, may have preselected barrier properties made from recyclable and/or reusable materials and extend over portions of the shipper so as to enclose the goods and/or vessels therein in a protected relationship. The vessels can be formed as part of the frame and sheath and/or added to the interior of the formed shipper and be suspended, supported, attached or a combination of these within the container.

A further advantage of the invention is that it provides a method of making a shipper for commercial use and transport shipping. The method comprises forming a structural framework for the shipper by providing a first series of first type framework structural members. Each first type framework structural member defines a horizontal structural member for the shipper. The method further provides a second series of second type framework structural members. Each second type framework structural member defines a vertical structural member for the shipper. The respective first type framework structural members are joined to the second type framework structural members near the ends of the first type structural member. Once the first and second type structural elements are in a perpendicular relationship a structural stabilizer contained in the vertical member moves by gravity, manually, or automatically into a slot in the horizontal structural element securing the two elements in predetermined relationship. Once the stabilizing element is removed from the slot in the horizontal element, the end panels of the shipper can fold into or out of the shipper into a flat configuration. When joined in such a manner the first and second typed framework structural members define respective rectangular or square panels. Each rectangular and/or square panel is bounded along one edge by at least a first type framework structural member and bounded along adjacent edges at opposite ends of the first type framework structural member by second type framework structural members. When so bounded, the panels are joined together in side-by-side relation as an array of panel with at least one second type framework structural member at each end of the panels. The panels correspond to intended walls of the shipper. An array of such panels are placed and/or folded together into a closed configuration to complete the structural framework with each of the panels defining a wall of the shipper. A sheath may be applied to the completed structural framework. The sheath may conform thereto such that it extends across the panels for containment within the sheath of a product to be packaged by the shipper. Vessels containing products can be placed into the interior of the shipper and be suspended, supported, attached to a combination of these within the shipper.

Other features and advantages will be appreciated by the reader or are pointed out in the following portions of the present disclosure.

BRIEF DESCRIPTION OF THE DRAWINGS

FIG. 1A is a perspective detail of a locking assembly at one corner of the erected frame of FIG. 1 for locking horizontal and vertical members of the frame into an erected condition.

FIG. 1B is a perspective detail of a locking assembly at an opposite corner of the erected frame of FIG. 1 for locking horizontal and vertical members of the frame into an erected condition.

FIG. 5A is a perspective view of a locking device or stabilizer which is used for causing the frame to be selectively locked into an erected condition.

FIG. 5B shows details of the locking device or stabilizer by three isometric views, namely face, end and side views thereof.

FIG. 9A is a perspective view of another form of a bottom longitudinal or horizontal frame element.

FIG. 9B is a side elevation view thereof.

FIG. 9C is a top view thereof.

FIG. 10 is a perspective view of a bridging longitudinal or horizontal frame element that provides horizontal linking of sides of the frame.

FIG. 12 is a side elevation view of two linked frames of the invention illustrating the manner in which reusable transport packaging or stacked tiers thereof can be linked in stable side-by-side or end-to-end relationship by a frame coupling or linking device or devices.

FIG. 12B is a detail of the linking device, as taken along section 12B of this figure.

FIG. 12C is a fragmentary perspective view of portions of frame members and the coupling device for showing interengagement of the coupling device with the frame members.

DESCRIPTION OF PRACTICAL EMBODIMENTS

Figure 1:
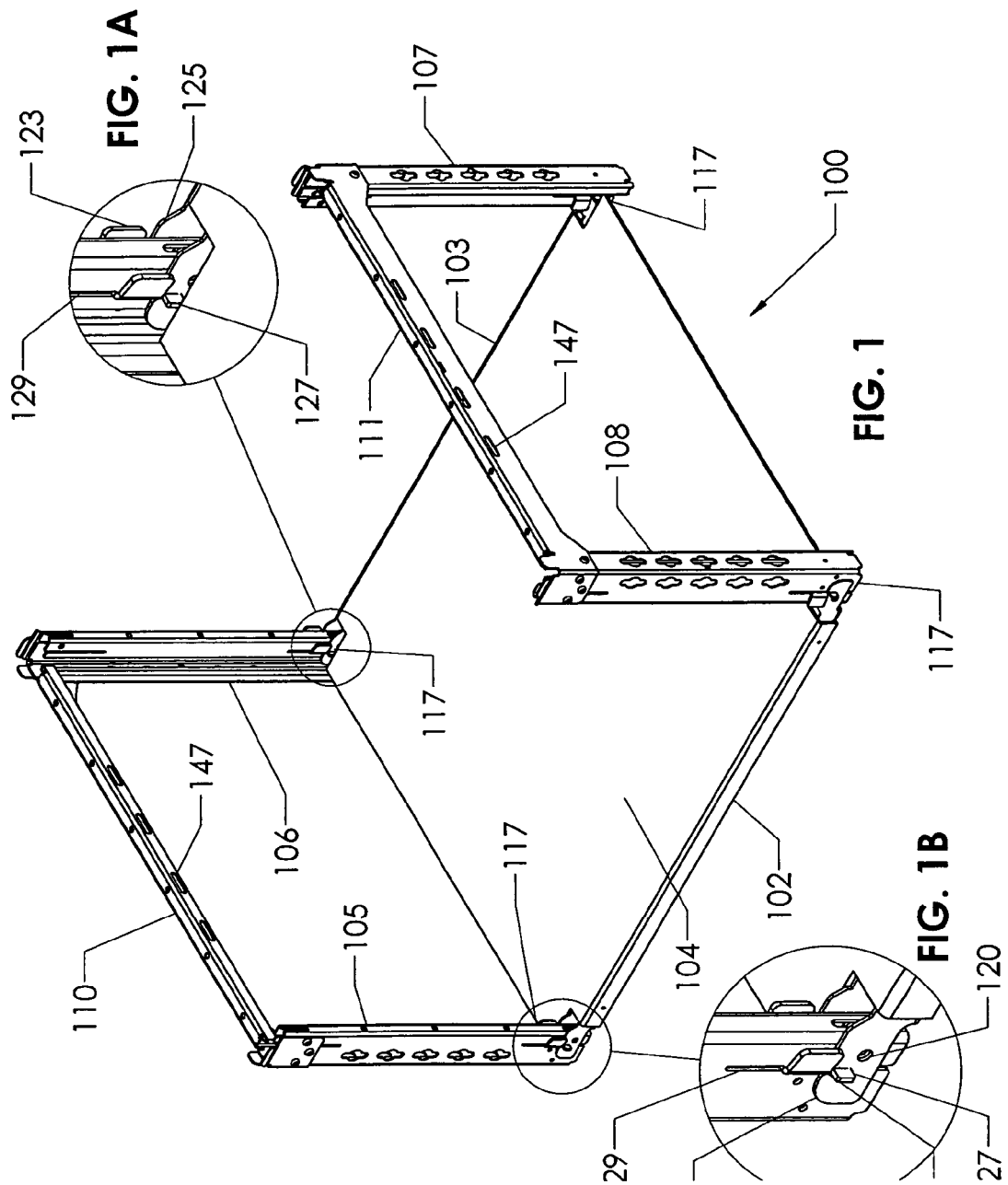
FIG. 1 is a perspective view of principle structural elements or frame portions, or what may be termed a frame, of reusable transport packaging in accordance with and embodying the present invention, as shown in erected condition, according to one embodiment having one type of closed bottom or floor.
Figure 2:
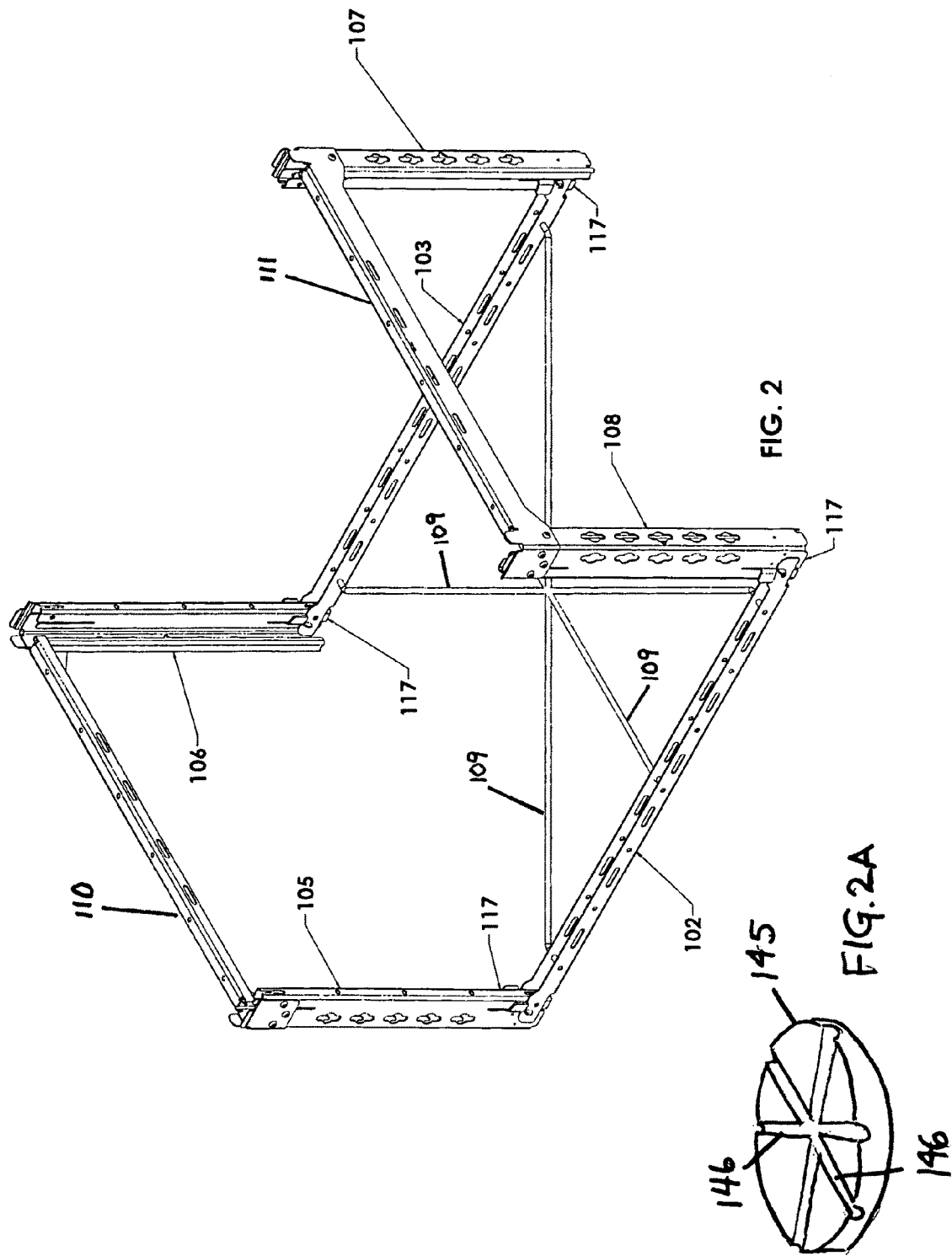
FIG. 2 is a perspective view of frame portions of reusable transport packaging according to another embodiment of the invention, in erected condition, and having a different support in place floor or bottom, although a floor is optional.

Referring to FIGS. 1 and 2, an exoskeleton framework is designated generally 100, which may also be referred to herein either as an exoskeleton, framework or frame, of the invention. It has two parallel horizontal base members 102, 103 at its opposite sides from which extend upwardly four mutually parallel vertical members 105, 106, 107, 108, in relation perpendicular to base members 102,103. Bridging across the vertical members at their upper ends are two horizontal upper frame members 110, 111, forming mutually parallel relationship to base members 102,103. An optional floor 104 is provided that is supported by base members 102, 103.

Frame 100 is representative of preferred framework constructions of the invention, although such frames may vary in dimension, covering can be provided for vessel-defining components, as by wrapping with film, or by employing fabric, mesh and other flexible, semirigid and/or rigid materials in uses described below to provide frame-formed packaging (also termed herein "shipper" or "shippers" or "package" or "packaging"). Also, the frames, which provide key structural, strength-defining reusable elements of the new packaging, can be used with or without covering, as for example in providing structure from which items or packages can be suspended from the frames or supported by a base or platform elements. Thus, it needs to be appreciated that the frames themselves may, as so used, become reusable packaging of the invention, and a frame, whether with or without covering, may become ultimate shippers of goods, for movement in commerce, shipping, storage and handling of goods such as (a) foodstuffs, such as produce, or such as canned goods, or other food items separately wrapped or grouped, or (b) non-food consumer and/or commercial goods of many different types; and (c) wet goods (or semi-wet or moist goods, produce being an example) or (d) dry goods as well as (e) aggregate or bulk goods and (f) chemical intermediates or chemically-produced goods; and so also (g) machine goods.

Frame-formed packaging (also termed "shipper" or "shippers") of the invention may also be stacked by secure nesting to provide stable stacks, and stacks may be connected together as stable tiers, as later discussed.

Fundamentally, the frame is most preferably rectangular. The dimensions of the frame can be varied according to the use for the new shipper, and the overall shape can be elongated, rectangular, square, or be of other geometric shape types. Typical dimensions of the new shippers can be considered for purposes of illustration of practical use. One preferred arrangement is a rectangular configuration providing typical dimensions of 24 in. length by 20 in. width by 10-12 in. height, allowing four units of the invention to fit as one layer on a standard food pallet 40 in.×48 in. often used for food and beverage purposes.

The exoskeleton framework 100 and its components are of suitable structural material including, without limitation, galvanized steel, stainless steel, alloys, composite plastics, or any other suitably engineered material, such as engineered plastics. Wood based products are also a possible material. Thus all vertical and horizontal members may be of such materials and preferably the same material is used throughout the shipper. From a production standpoint, the entire structure, as well as the stabilized, will be formed of preferably the same material, such as galvanized steel.

Floor 104 may be of thin, semi-rigid material, such as of reusable or recyclable formed, extruded, molded or thermomolded synthetic resin material or of composite or multilayered material, and may be either of fully reusable character or it may be of such lightweight construction as to be readily replaceable by recycling. Thus, floor 104 may, similar to or compatible with frame 100, may be of composite plastics, or any other suitably engineered material, such as engineered plastics capable of reuse or recycling.

FIG. 2 shows the optional provision of cross-brace elements 109 of rod-like or strip-form material which may be formed of the same materials as the principal members of the frame, such as stamped or formed metal, or may be of different materials than the principal members, such as synthetics substance. Elements may engage the frame members 102, 103 by tacking, welding, adhesive or by engagement of suitable apertures in frame members 102, 103. Elements 109 are of such strength and number as to provide reliable support for floor 104. The star configuration of three such elements as depicted in FIG. 2 is desirable as it provides central support of floor 104 for enhanced strength and shock protection.

Regardless of its dimensions, the frame is adapted to be either easily erected, as shown in FIG. 1, or easily folded, as shown in FIG. 2, so as to facilitate quick use and filling with goods, and to facilitate quick folding when emptied after use, compact storage after use, configuration that facilitates return shipment for reuse and inventory storage before reuse.

Figure 3:
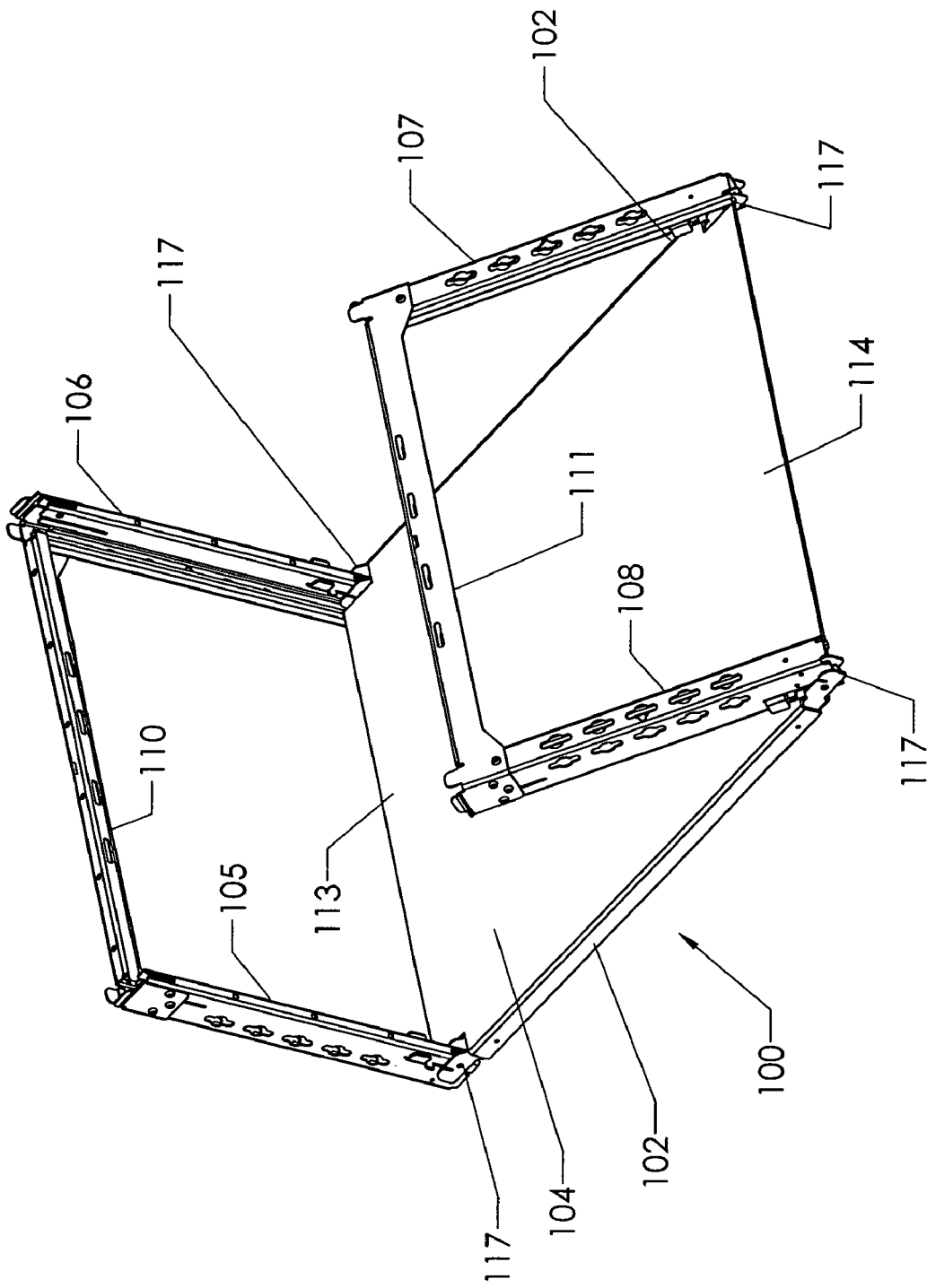
FIG. 3 is a perspective view of the frame as according to FIG. 1, but shown in a partly folded condition with end portions as they are shown partly folded inwardly relative to a central base portion in an orientation during folding or unfolding of the frame.
Figure 4:
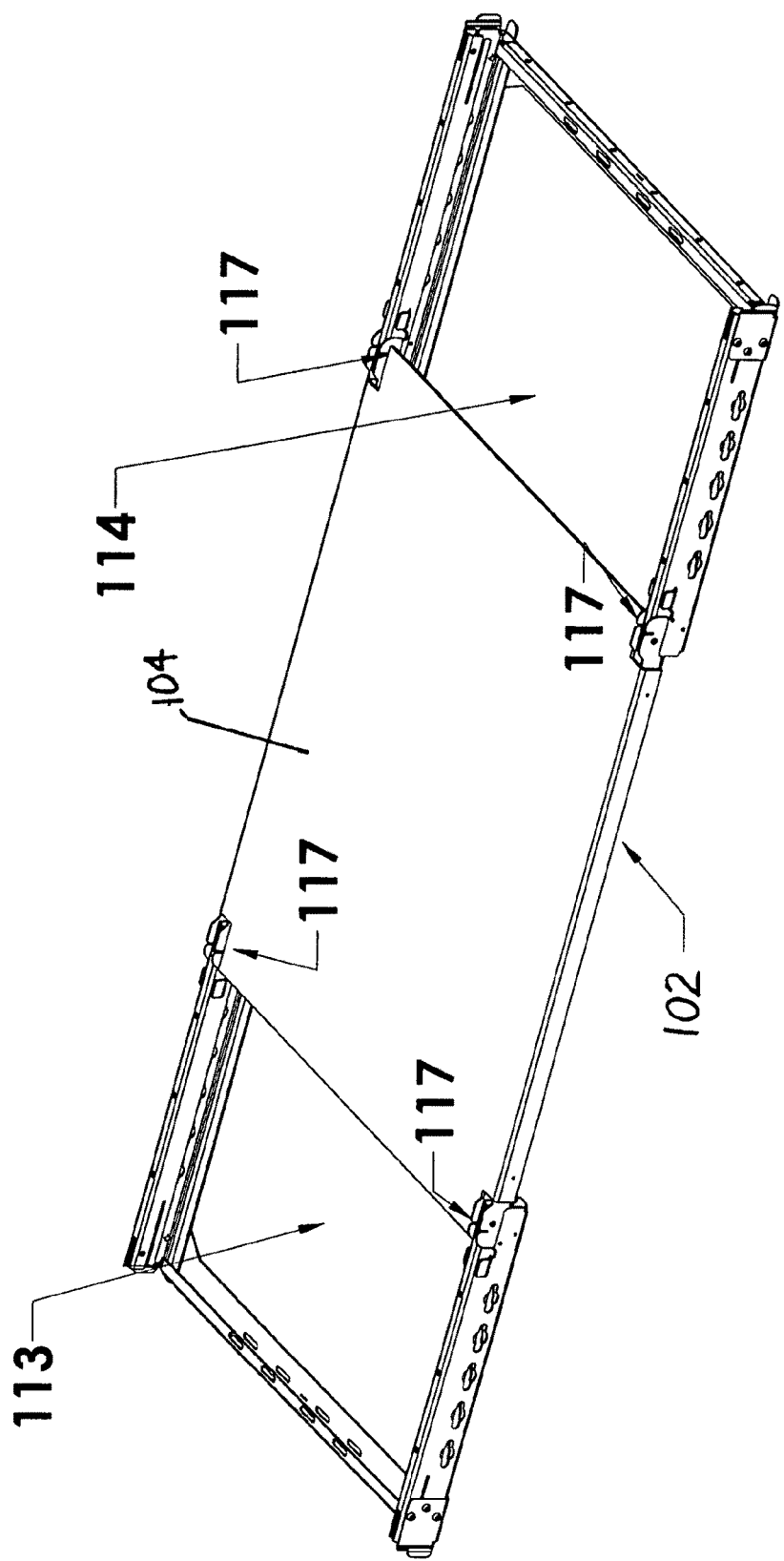
FIG. 4 is a perspective view of the frame as shown in an unfolded condition with end portions extending outwardly relative to the central base portion so as to lie coplanar with the floor in the frame according to FIG. 1.

FIG. 3 shows folding of the opposite ends, here designated 113, 114, as they are folded toward each other on pivots 117. The end member and base member dimensions may be such that the end portions do or do not overlap, as according to a preference, as the overlapping or non-overlapping relation is defined by the relative dimensions, such as if the lengthwise portions 102, 103 of the base are shorter, than the end portions 113, 114 will overlap, as may be appropriate for some usages. Another possibility is that one end portion, such as 113 may be folded in, and an opposite end portion 114 can be folded out. According to yet another use, and configuration, the end sections can be folded outwardly as shown in FIG. 4. The advantageous function of the frame folding arrangement is to permit reduction to small, reduced and/or least possible dimensions for shipping, storage, and, in general, to facilitate collection and reuse of the frame.

The vertical members are each slotted, not only for lightness of weight but in also to permit suspension of components at intermediate portions along their height, and other uses mentioned below. Similarly, the upper horizontal frame members along the top surface have a series of slots, in this case shown as cruciform/keyhole shape, as one of several possible slot geometries, permitting suspension of vessels to hold products in a suspended or sling type arrangement as by key or other element engagement with the slots. The lower frame members are similarly slotted, not necessarily with cruciform/keyhole shape or configuration, but preferably providing uniformity of design and manufacture. The various slots along the lengths of the frame members have a wide variety of possible uses, such as fixing or suspending vessels, affixing dividers, platform or support elements and securement or suspension of products, among other possibilities.

Generally, vertical members 105,106, 107 108 are each pivotally affixed to the respective horizontal members 101, 102 forming the base, whereas the horizontal members forming the upper channels 110, 111 are preferably affixed to the upper end of the vertical members, as by metal screws, rivets, or suitable fastening means, including spot or tack welding or by other fixing, to provide a strong and relatively rigid construction which will survive the stresses of shipping and handling.

The arrangement permitting folding and erection, and locking into erected condition of the frame as it is shown in FIGS. 1 and 2 is illustrated by the detail drawings of FIGS. 1A and 1B. The pivots 117 may take various forms. As shown in FIGS. 1A and 1B, the respective horizontal and vertical frame members are joined in pivotal relationship by means of a rivet or pin-and-cap assembly 120.

The erected relationship is provided by stabilizers of the invention. Such stabilizers, which may be referred to by other names, such as locks, locking devices, latches, latching devices and other terms of convenience) are representatively designated at 123 as shown in FIGS. 1A, 1B, 5A, 5B and 6. The stabilizers interengage the vertical members with horizontal members 101, 102. FIG. 1A and FIG. 1B show respectively outside and inside views of the stabilizers. In the horizontal members, 102, 103 the pivot 117 is provided by rivets or devices (such as pin-and-cap assembly) 120 that extend through a portion of the horizontal member. The horizontal members are formed with a recess or cutaway at their opposite ends to providing endwise extensions, designated 125 in FIGS. 1A and 1B, that provide relief, access or room for pivoting movement of the vertical members as designated 105, 106. When the frame is erected as shown in FIGS. 1 and 2, secure and stabilizing locking interengagement of the vertical and horizontal members is provided by the stabilizers 123 received in vertical slots as at 127 formed in the outward extensions 125 so that the stabilizers are slideably captive in the vertical members. Similarly, there are lengthwise slots 129 in the vertical members to permit the stabilizers to slide up and down, the dimensions being chosen for a desired fit. For example, there can be selected a loose fit of a stabilizer within its corresponding slot, which keep the stabilizers captive in the vertical members but allow movement down by gravity, the stabilizers being in that way just loose enough in the corresponding slots to fall into position when located as shown in the drawing, but falling in the opposite direction as the frame is inverted. Thus in one step, it is easy to erect the frame as stabilizers fall into position to maintain a locked arrangement with frame rigidity for use. So also, after use, the frame of the package or shipper can be turned over and gravity will cause the stabilizers to fall out of the locked engagement and so allow immediate or rapid opening of the frame and its folding into a flat position once again.

Other means, such as springs, manual movement or automatically implemented movement can possibly be used to move the stabilizers into or out of engagement with the horizontal members 101, 102. So also, the retainers may be relatively more tightly fitted into their corresponding slots so as to be movable only upon application of manual or machine-implemented force. Latches, tape, or vessel parts although presently not preferred, and not here shown, can be added to the vertical members to keep the retainers selectively in or out of locking relationship, if desired. As a further alternative, the stabilizers can be provided for captive slideable movement within the horizontal base members 101, 102.

Referring to FIG. 5A, an example of the stabilizer 123 is shown in perspective view. Each stabilizer has a base portion 123*a*, and wing portions 123*b* at opposite sides which extend upwardly from the base portion in diverging relation. The preferred angle of divergence is about 10° but other angle relationships may be found possible according to preferred use or to facilitate manufacture or operation. Base portion 123a extends laterally outwardly along portions 123b to provide a key-shaped outer end 123c with outer wing parts 123d at opposite sides which engage horizontal slots 127 in the horizontal frame members.

Figure 6:
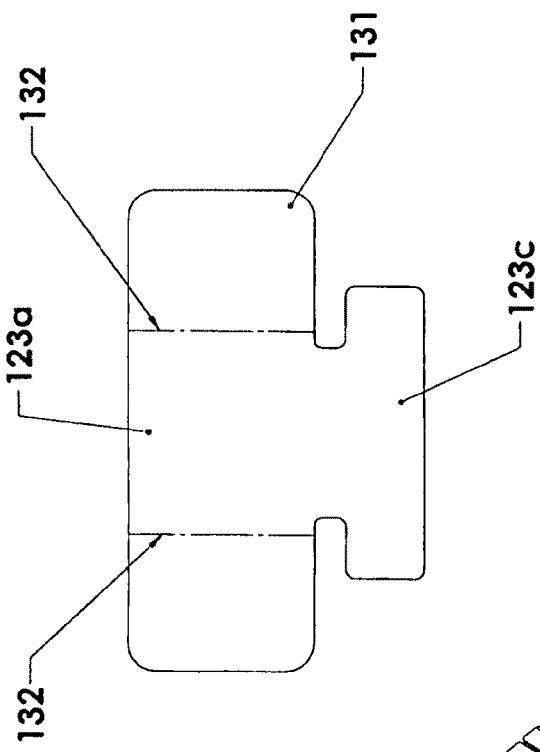
FIG. 6 is a top elevation view of a blank from which the stabilizer is formed, and with fold lines indicating lines at which bending is to take place to form the stabilizer.

FIG. 5B is a grouping of views, namely top plan view with side and end elevation views of the stabilizer 123. FIG. 6 shows a manufacturing layout plan of a blank or manufacturing element 123 showing fold lines 132 upon which the diverging wing parts 123b are created by folding during manufacture if the stabilizer, as preferred, is formed in metal. Metal is not the only material which can be used, as discussed below.

Figure 7:
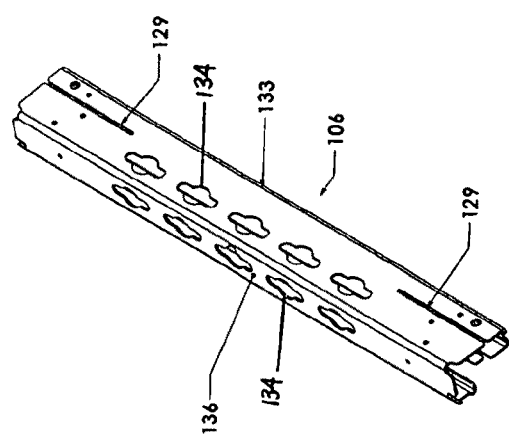
FIG. 7 is a perspective view of an upright frame element.

Referring to FIG. 7, a fragmentary perspective view of a portion of a vertical frame member, such as for example that designated 106 in FIG. 1, is shown. Said vertical member has slots 129, 129' at its ends for receiving stabilizers of the invention depending upon configuration, and the construction is seen to be symmetric from end to end. Further slotted apertures are provided for securement of suitable fastening means, to secure loads or items in the framework, as well as for lightening of the structure. Each of slotted apertures 134 is of approximately keyhole shape having a central circular part and end-wise elongations thereof along the axis of elongation of the part having the slots, being thus also generally cruciform.

Other aperture shapes are possible. The horizontal frame member of FIG. 9 is provided with a series of lengthwise slotted apertures (which may be called "slots") 134 in opposed parallel rows, as in FIG. 9A; and so also, such slotted apertures may be provided in staggered relationship. In general, if in opposed and/or parallel rows, the slotted apertures of the adjacent rows can be either co-aligned or staggered so as to permit accommodation of different sizes, shapes of securement devices for carrying of products within a shipper, and adjustment of location. Thus, referring to FIGS. 9A, 9B and 9C show slotted apertures having elongated shape of constant slot width and fixed length, rounded at opposite ends, wherein each pair of slots, the slots being here designated 136', here shown separated by a circular hole 136" as one of many possibilities. The slots are at various locations along the length to permit devices or fasteners or carrying devices to be selectively located or secured in the slots so as to allow goods to be adjusted in location within an erected shipper. Slotted apertures are also shown at 137 for the top horizontal member 110 for similar possible affixing of carrying devices.

Referring again to FIG. 8, the cross section of the vertical member, such as those shown at 105, 106, 107, and 108, showing that it has a first leg 133 and a shorter leg 135, each of which is provided with a respective return, as at 133a, 135b which in turn is provided with a further respective short return 133c, 133d, all for providing strength and compactness. The cross section is thus overall L-section in general appearance but provided with greater strength because of the returns. The overall shape provides in effect a notch or inward corner 138.

The vertical members of the horizontal upper members or rails 110, 111 are provided with a series of perforations or apertures as designated at 147, as also seen in FIGS. 1 and 3. The shape of the apertures or perforation 147 may either provide notches or constant slot width and fixed length openings, such as elongated slots 147' shown in FIG. 1. The latter are elongated in the direction of the lengthwise orientation of the vertical members and the lower horizontal members to allow vessels or vessel-defining or vessel-cooperative structure to be attached as by fastening devices, hooks, straps, clamps, tie-downs and other fastening expedients, and such slots or apertures are located at intervals along the length of the frame members.

Figure 8:
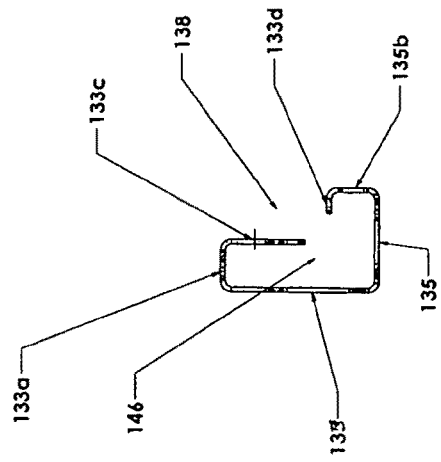
FIG. 8 is an cross-sectional view of an upright frame element showing its section.
Figure 11:
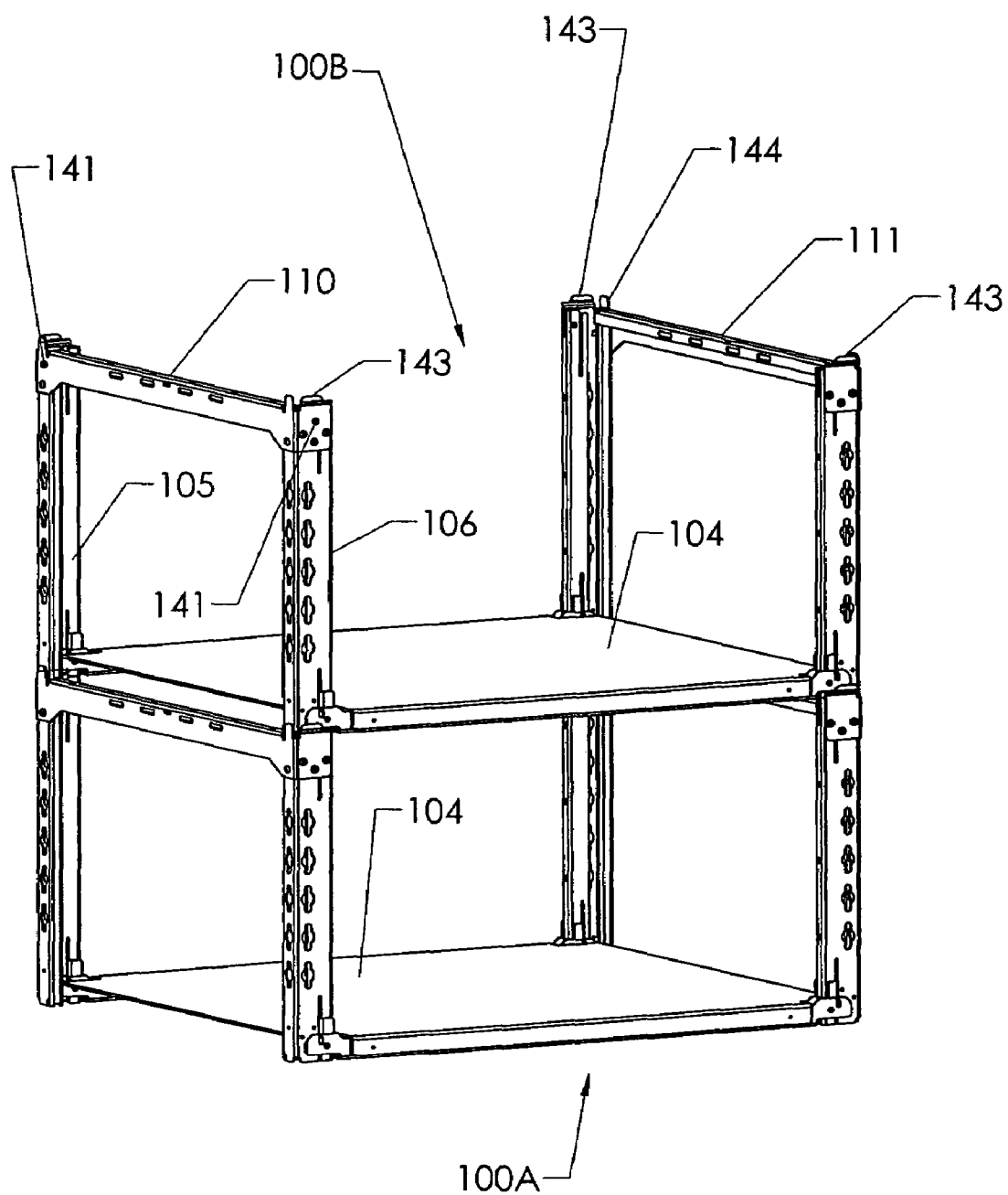
FIG. 11 shows stacked frames illustrating the manner in which reusable transport packaging can be stacked in tiers according to the present invention, it being understood that the stacked frames are shown as incomplete packaging so as to illustrate more clearly how stacking is maintained by nesting or interlocking relationship between individual packaging assemblies.

Referring to FIG. 11, which shows two frames which are stacked, and there designated 100A at the bottom and 100B at the top. The stacking is made possible selectively by either nesting or interlocking of tabs at the upper ends of each frame with corresponding elements at the lower part of the frame above it. FIG. 11 also shows the configuration and securement of the upper horizontal members, or which may be referred to as rails, of the frame, with the vertical members. Thus, for example, for frame 100B, horizontal member or rail 110 is provided at its opposite ends portions 141 that are relatively enlarged and with sufficient vertical dimension to engage and overlie a substantial part of the corresponding vertical frame member. The end portions 141 wrap around and conform to the end parts of the vertical members, such as that shown at 106, and may be provided with a series of apertures for receiving screws, rivets or other fastenings, for securement to the vertical members, e.g., those at 105 and 106. Projecting tabs 143 and 144 of the end portions 141, 142 extend upwardly from the outer surface of the end portions 141, 142 to provide secure nesting engagement of the lower rail portions of a frame unit to be stacked above. Thus, there are at each end of rail 111, for example, a pair of tabs, there being a relatively large tab 143 strong tab which extends upwardly from the side of the frame and a relatively smaller stabilizing tab 144 which lies in the plane of the end portion of the frame, and so the tabs 143 and 144 at each upper corner are mutually perpendicular to provide stable and secure interengagement both longitudinally and laterally of a corresponding frame unit of the invention to be stacked above. Tabs 143 are formed with slight outward divergence, being angled out slightly from the plane of the respective end portion, and in this case, so that the tabs 143 extend slightly outwardly from the surface of the vertical member for receiving lower rail portions of another frame above it. The smaller of the two tabs, as designated 142 is chosen to have a dimension which will fit within the base of the vertical member of a frame above it. Referring to FIGS. 7 and 8, vertical frame members have a cross section including a space inwardly or opening to receive such a tab, for the purpose of interlocking relation.

It is seen accordingly that a key advantage of the new frame is that the vertical members very readily allow either reliable stacking or nesting of frames, one atop the other. The horizontal upper members each have at the outer ends a pair of tabs, one along the main vertical extending tabs and also along the portion which forms the end piece so that a stable corner is defined which will receive the corresponding base of the next shipper. It is also seen that at the lower end of each vertical member there is a corresponding slot for receiving a tab of a vertical member of an identical unit next below the shipper. Such an arrangement provides highly reliable interengagement during stacking with secure interlocking and stability of an entire stacked group of the units of the invention. This allows for example five, seven, eight or nine units stacked high if the units are positioned, for example, on pallets in trucks, rail cars or other international shipping units. The tab features here provided permit many frames to be stacked in stable, secure relationships so that an ultimate stack does not sway or wobble during shipment to maintain product safely under conditions of shipment. Thus, it is seen that by one or more such tabs 143, 144, there is provided for the reusable transport packaging atop the vertical members stacking structure to engage a like reusable transport packaging apparatus above the claimed reusable transport packaging apparatus for stacking thereof. In place of tabs 143, 144, there may be used other vertical projections, rods, nubs, screws, nuts, and other projections to engage and stack with secure, nesting or engaging relationship a next upper reusable transport packaging apparatus.

Such an arrangement protects the contents, of course, but also is intended to avoid so-called hydraulic action in which contents above press against the contents below to cause damage, which is particularly heretofore a problem with soft goods such as fruits and vegetables. In typical stacked container arrangements presently in use, the goods and packages of each container press down upon the goods and structure of the container below, so that it is typical in shipment of perishables and soft vegetables or fruits for example to lose as much as up to 25% of the goods because of the damage being caused by the so-called hydraulic action of the stack of goods. The present structural vertical members, given their strength, compared to cardboard or paperboard or other cellulosic materials, are greatly resistant to distortion or bending or collapse, and thus have capability to protect such goods to a degree not heretofore achieved. Another advantage is that the basis of each of the units in a stacked array allow some spacing between products of the units, so that each unit is protective of the goods in it, without the weight of units above it pressing down on the contents. It should be greatly emphasized that the stability of the stacked structures is far greater or superior to cardboard, paper-based or other known plastics of the prior art.

In the case of a frame of the invention configured according to FIG. 2 where bracing or floor support elements 109 are used, a further protection to prevent by the so-called hydraulic action of the stack of goods contained in the frame packages is made possible by employing a cushioning device as designated 145 in FIG. 2A which is, as one possible configuration, a shock absorber device as in the form of a disk of resilient material, such as closed cell foam polymer or rubber, having slot-like grooves 146 formed therein for mutually engaging the floor support elements 109 as by friction, adhesive or resilient fit so as to be retained by the floor support elements 109 in a position centered over their crossing. The disk may be of constant height, except for the grooves or slots 146, sufficient for occupying a space beneath the floor support elements 109 and the surface upon which the frame package normally will be seated, as during shipment. It is capable at least of pressure at the floor upon shock imparted by the so-called hydraulic action of the stack of goods contained in the frame packages if, for example, the loaded frame package is dropped in place. Thus, the disk serves by its resilience to absorb the blow or shock of goods, and so prevent damage, as they tend to move down if the loaded frame package is dropped. Other geometric shapes of cushioning device 145 may be employed, such as square or rectangular, oval, and so forth, and securement thereof to the frame package may be provided by means other than grooves or slots, such as by adhesive securement or fastening devices such as wire brads or by projections upward from the cushioning device for engagement of floor structure of the frame package.

Although in FIG. 11 two units 100A and 100B are shown stacked, such illustrates that numerous frames of the invention, each containing product, can be stacked securely in a tall tier, such as upon a pallet and extending from the pallet floor to the roof of a carrier such as a truck, railcar, intermodal or international or "ISO" container, or other shipping vessel.

Frames of the invention can be used in such a variety of ways that it is not practical to illustrate each of the various configurations and embodiments, but a few will be enough to illustrate practical usages.

FIGS. 12A, 12B and 12C illustrate linking together, side-by-side, of adjacent frame units 100C and 100D, which though showing only frame components are representative of complete packages, and the securement together of linked frames so that reusable transport packaging or stacked tiers of the inventive frames are secured in stable side-by-side or end-to-end relationship by a frame coupling or linking device or devices 149. Such a linking device, here called simply a link or clip, is shown in detail in FIGS. 12B and 12C, and is formed of preferably of metal such as galvanized steel or suitable alloy, such as stainless steel, which may be formed by stamping and providing a central recessed portion 149a of recessed, U-shaped character (as viewed from upper or lower end) that merges into opposite flanges 149b each carrying inwardly protruding ears 149c for engaging resiliently and securely by snap engagement of the apertures of the vertical frame members such as 105 and 108. Links 149 readily slide and/or snap into place as shown to maintain the linked relationship of the adjacent frames. The U-shaped center portion fits between vertical frame members of adjacent package frames for maintaining appropriate spacing therebetween. Several such links 149 may be used to stabilize and link together two tiers of vertically stacked frame packages, and so keeping the tiers locked together for stability and security.

Many varieties of frame-construction packaging is made possible by folding framework of the invention.

Figure 13:
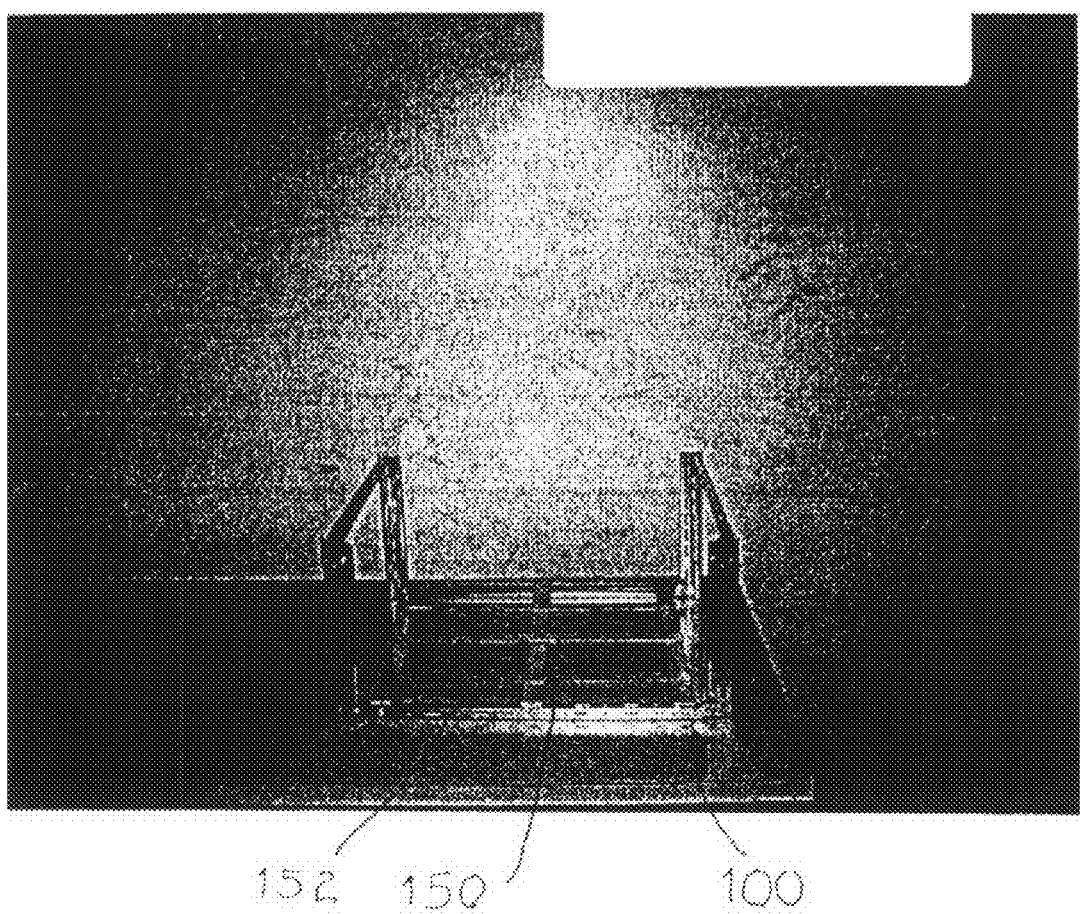
FIG. 13 is a perspective view of the frame to which fabric, film or mesh materials, is added to base and end sections to provide vessel assembly for the frame of the new reusable transport package.

FIG. 13 shows a frame of the invention provided with a floor or platform generally designated 150 formed of strips both lengthwise and widthwise which are attached to the lower rails 102, 103. Said strips, as designated at 152 for example, may be of a variety of materials, such as galvanized steel, stainless steel, engineered plastics and composites or fabric to provide a base of support for products which are carried or suspended within the frame. Although strips are shown in FIG. 13, it will be possible also to use a complete or continuous floor or platform, either with or without apertures, of various nonporous, porous, or mesh materials, whether solid or flexible or fabric or of screen-like type so as to completely close the bottom of the frame. So also, such materials used to form the floor, and overlying the base, may be extended upwardly into the end frames or may be wrapped around or secured to upper horizontal frame members or rails 110, 111 so as to extend from these members 110, 111 and then either beneath or above the horizontal base members 102, 103.

It will also be understood that the floor 150 the base comprises as little as a single strips elements extending between the two lower frame members 102, 103.

Referring to FIG. 13, a shipper of the invention is completed by having added to its frame fabric or film materials or mesh or screen-like materials, to provide vessel-defining extent or at least partial receptacle of flexible material fitted to the framework for containment of goods within the vessel-defining material at least partly enclosing an goods-receiving interior of the framework so as to form a complete reusable transport package.

Such materials are in this the example shown as being nylon and polyester mesh. The vessel-defining material is added to the base and end sections, as in the form of a sleeve, to provide at least a minimal vessel-forming component so that the entire unit forms a complete reusable transport package. Mesh is only one possibility, as film and other fabrics and semi-rigid and rigid materials, being selectively either porous or nonporous, can be used instead across the base and the end sections.

Figure 14:
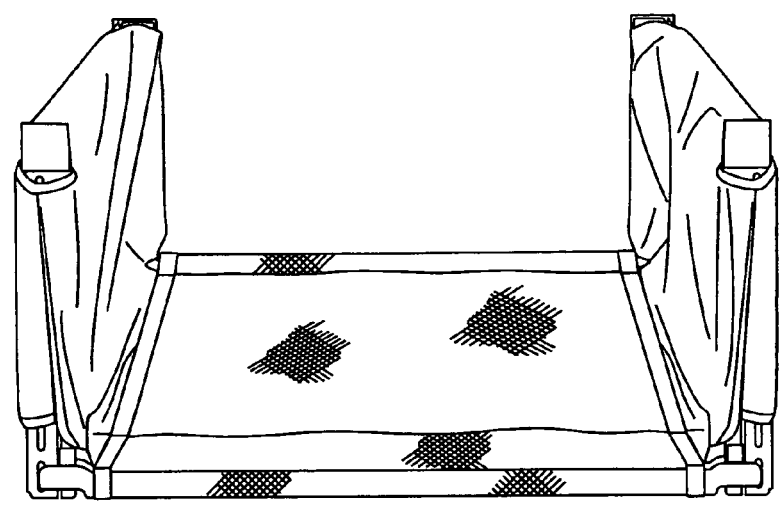
FIG. 14 is a perspective view of the frame to which a vessel, of fabric, film or mesh materials is added to the frame so that vessel-defining material overlies base and end sections of the frame in the new reusable transport package of the invention, but with side portions of the frame not yet in place or optionally to be provided.

FIG. 14 shows added to the frame a vessel of fabric or film materials, in this instance of nylon and polyester, so that vessel-defining material overlies base, side and end sections of the frame in the new reusable transport package. To form this embodiment, the frame is fitted according to one possibility with nylon sleeving, that is, a sleeve, formed to create pockets which are fitted over the ends to support the central portions of the vessel within the frame. Again, the fabric or other vessel-forming material can be of a porous or mesh type, if preferred, but nonporous film and fabrics, treated or untreated with protective substances can be used. The vessel-forming portions across the base and the end sections may be instead of semi-rigid or rigid materials.

Figure 15:
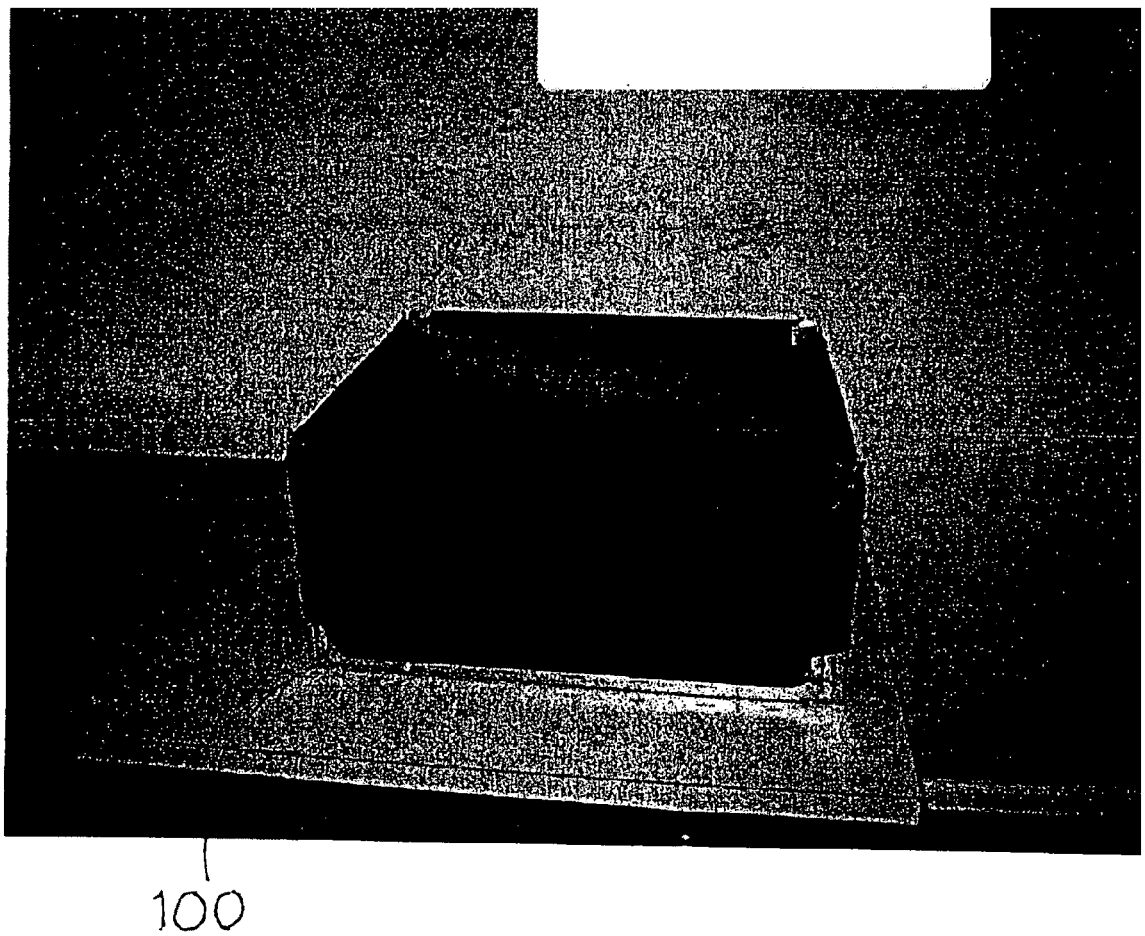
FIG. 15 is a perspective view of the frame to which a vessel, of fabric, film or mesh materials is added to the frame so that vessel-defining material overlies base, side and end sections of the frame in the new reusable transport package of the invention, and so such materials fully surround the periphery of the vessel so provided.
Figure 16:
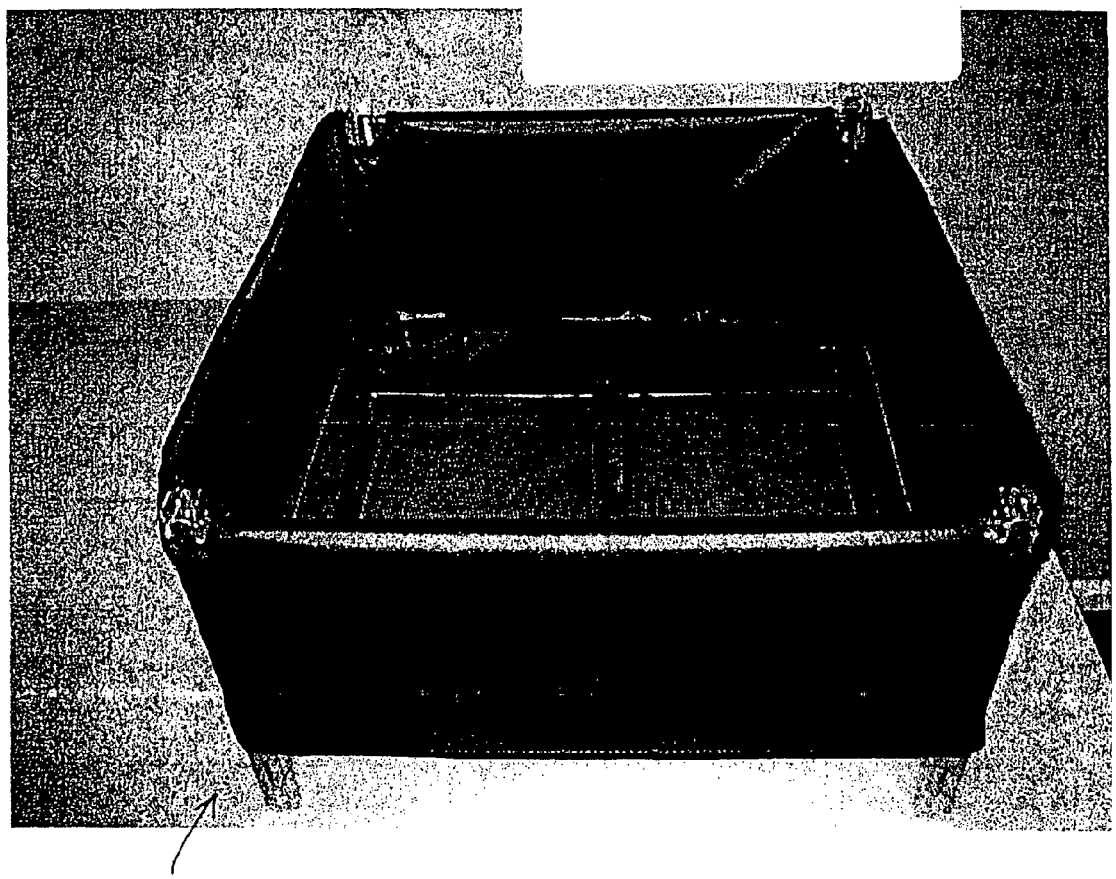
FIG. 16 is a perspective view of the frame to which such a vessel of fabric, film or mesh materials, in this instance of nylon and polyester mesh, is added to the frame in a vessel-surrounding manner. Supporting strip-like support members of the base portion are visible.

FIG. 15 illustrates the frame and vessel, here of nylon and polyester mesh. The vessel is added to the frame, serving to illustrate how vessels can be supported and suspended by and from the frame. Supporting strap-like support members of the base portion, are visible. The support members may be of metal or fabric or other materials and as closely or widely spaced as required for the nature of goods to be contained within the vessel. The vessel is separately formed and then can be suspended from the frame, as by manual semi-automatic, or automatic process. In a simplest mode no equipment is necessary for its use. A major savings to the user results. These are accordingly examples, from among many possible variations, of vessels to be supported and/or suspended by the frame. The floor of the vessel-forming portions may be of nylon and, as an example, can be secured by the use of "VELCRO™" hook-and-pile cooperative elements. Alternatively, the floor and side-forming materials can be permanently sewn or riveted. As a further alternative, a fabric material can form the base, but a central portion of the base is a rectangular window of mesh, and such is illustrated in FIG. 16. The mesh provides advantage not only for air circulation while allowing the products to be washed down as in the case of packing, storage and shipment of melons, tomatoes, and other fresh produce, while also allowing air circulation as may be desired for long distance or time-sensitive transport of vegetables, fruits and other perishable commodities.

As a method of providing and using transport packaging apparatus, the invention comprises forming a frame of vertical and horizontal members so connected to define four vertical members, a pair of oppositely disposed upper end horizontal members fixedly connected to upper ends of pairs of the vertical members, and a pair of horizontal members pivotally connected to and interengaging lower ends of another pair of the vertical members and defining pivots at lower ends of the vertical members, together with provision for selectively stabilizing or destabilizing the pivots;

erecting the frame by orienting the vertical members in upright configuration and stabilizing the pivots;

using the frame to carry contents therein in commercial use;

folding the frame by destabilizing the pivots; and returning the frame to a location for refilling with contents and reuse.

The provision for selectively stabilizing or destabilizing the pivots can be gravity-responsive stabilizers at proximate the pivots, wherein the step of erecting the frame by orienting the vertical members in upright configuration and stabilizing the pivots is carried out by placing the frame in an upright configuration to permit the stabilizers to move to a stabilizing position in response to gravity; and the step of folding the frame by destabilizing the pivots is carried out by placing the frame in an inverted configuration to permit the stabilizers to move to a destabilizing position in response to gravity.

Such method may include inserting into the frame a vessel for containing contents, supporting the vessel within the frame, using the vessel for containing the contents for a period of use; and then removing at least a portion of the vessel after the period of use.

The embodiments and examples were chosen and described in order to best explain the principles of the invention and its practical application to thereby enable others skilled in the art to best utilize the invention in various embodiments and with various modifications as are suited to the particular use contemplated.

For example, framework containers of the invention can have more than one compartment, and such compartments can have individual vessels.

As various modifications could be made in the constructions and methods herein described and illustrated without departing from the scope of the invention, it is intended that all matter contained in the foregoing description or shown in the accompanying drawings shall be interpreted as illustrative rather than limiting. The invention should not be limited by any of the above-described embodiments, but should be defined only in the following claims and their equivalents.

What is claimed is:

1. A reusable transport packaging apparatus of erectable-foldable character, characterized by:

the framework comprising a frame capable of erected and collapsed states;

the frame of structural elements comprising a pair of parallel base horizontal members each having connected thereto at opposite ends of the base members a pair of vertical members, such members being vertical when the frame is erected, each being pivotally connected to a corresponding end of the base horizontal members by a pivot having an axis such that the vertical members are each permitted to pivot by endwise folding movement either toward or away from the horizontal base members in the direction along the horizontal base members;

the frame further having a pair of oppositely disposed upper end horizontal members fixedly connected at outer ends to corresponding upper ends of the vertical members, the upper horizontal members each being mutually perpendicular to the lower end horizontal members, the vertical members at each end of the frame and the upper horizontal members affixed thereto defining oppositely disposed, parallel end walls;

provision to permit stabilizing or selective destabilizing of each of the pivots, and when the pivots are each stabilized, each of the vertical members extending upward perpendicularly from a corresponding end of the horizontal base members, the frame being then in upright, erected upright configuration for carrying contents;

the structural framework capable when erected being rectangular and having four upper corners and four lower corners and forming an exoskeleton of open panels including a pair of side panels and a pair of end panels for carrying materials of vessel-forming character to hold and protect products to be transported within the framework;

and the frame when the pivots are destabilized being capable of being collapsed into a folded space-conserving configuration for storage, return shipment or future use with the frame end panels selectively in either a (a) first folded configuration with the end panels folding inward and lying over and along the horizontal base members or (b) a second folded configuration with the framework end panels folding outward and extending outwardly from outer ends of the corresponding lower horizontal base members;

whereby in either folded relationship the frame occupies flat-folded space-conserving configuration;

the frame being adapted for carrying when erected flexible vessel-defining material for extending over and covering at least some of said panels so as to at least partly enclose contents within the frame when erected and to thereby protect products to be transported within the framework;

the vertical members and horizontal members defining when the framework is erected a plurality of windowed frame panels comprising the opposite end panels, and opposite side panels, the panels of the framework being joined at lower and upper corners defined by the upright structural elements;

the framework when erected providing a contents-receptive configuration of the shipper and protects the shipper and its contents against the stresses of filling, storage, distribution, merchandising and use of the packaging;

said provision to selectively stabilize or destabilize each of the pivots being at each of the four lower corners a gravity-responsive stabilizer slideably captive in the vertical member for each such corner selectively shiftable in response to gravity to a position of locking engagement with respective vertical and horizontal elements, so as to maintain the frame in an erected condition, each gravity-responsive stabilizer being shiftable in response to gravity when the framework is inverted to a position of unlocking to permit the frame to fold into an unerected condition; and stacking structure atop the vertical members to engage a like reusable transport packaging apparatus next above the claimed reusable transport packaging apparatus for stacking thereof.

2. A reusable transport packaging apparatus according to claim 1, further characterized by the structural elements defining, when the frame is in unerected condition, a reusable portion of the apparatus which, without contents, can be returned to a location for being refilled with contents, so as to be sustainably capable of reuse many times.

3. A reusable transport packaging apparatus according to claim 1, further characterized by each stabilizer being carried at the lower end of each vertical member for movement between locking and unlocking positions, such that when a vertical member is perpendicular to a horizontal base member, the stabilizer of such a vertical member is moved from an unlocking to a locking position to fix the perpendicular relationship stably.

4. A reusable transport packaging apparatus according to claim 3, further characterized by each horizontal base member being provided with a slot at each end for receiving a respective stabilizer, such that when a vertical member is perpendicular to a horizontal base member, the stabilizer is moved by gravity into the slot for securing the respective vertical member to the respective horizontal base member in stable perpendicular relationship.

5. A reusable transport packaging apparatus as set forth in claim 1, further characterized by each of the stabilizers being slideably captive within corresponding slots of the vertical frame members at lower ends thereof.

6. A reusable transport packaging apparatus as set forth in claim 1 further characterized by a of flexible porous or non-porous material carried by the framework for containment of goods within the vessel-defining receptacle at least partly enclosing a goods-receiving interior of the framework so as to form a complete reusable transport package.

7. A reusable transport packaging apparatus as set forth in claim 1 wherein the stacking structure atop each of the vertical members comprises at upper corners of the apparatus a first tab diverging and upwardly from one or more of the vertical members, and a relatively smaller second tab near the first tab to be received by a corresponding vertical member of a next above like reusable transport packaging apparatus.

8. A reusable transport packaging apparatus as set forth in claim 1, further characterized by:
when erected, the frame having a windowed character;
the horizontal and vertical structural elements of the frame being each of such structural material and configuration as will provide the apparatus with strength which is at least about 80-85% or more of the strength of a non-windowed container of such structural material.

9. A reusable transport packaging apparatus as set forth in claim 1, further characterized by:
when erected, the frame having a windowed character to provide a plurality of open panels including the two end panels and the two side panels, a bottom panel and a top panel;
the frame carrying flexible vessel-defining material for extending over and covering at least some of said panels so as to at least partly enclose contents within the frame when erected.

10. A reusable transport packaging apparatus as set forth in claim 1, further characterized by the vertical frame members being each provided with a series of apertures therein and further comprising in combination with the transport packaging apparatus:
a link configured with flanges for securely engaging vertical members of adjacent units of transport packaging according to the foregoing, in side-by-side relationship for stabilizing interconnection.

11. A reusable transport packaging apparatus as set forth in claim 10, further characterized by said link including a recessed center portion and opposed flange portions, each flange portion being configured for lying against vertical members of adjacent units, and each flange portion having upset elements for secure engagement with apertures in corresponding vertical members.

12. A reusable transport packaging apparatus as set forth in claim 11, further characterized by said link recessed center portion being of U-shaped character as viewed from an upper or lower end) that merges into the opposite flanges, the U-shaped center portion fitting between vertical frame members of adjacent package frame for maintaining appropriate spacing therebetween.

13. A reusable transport packaging apparatus as set forth in claim 1, further characterized by said horizontal and vertical frame members each being provided with a series of apertures along major portions of their lengths.

14. A reusable transport packaging apparatus as set forth in claim 13, further characterized by at least some of said apertures being approximately keyhole shape having a central circular part and end-wise elongations thereof along the axis of elongation of the part having the slots, being thus generally cruciform.

15. A reusable transport packaging apparatus of erectable-foldable character, characterized by:
the framework comprising a frame capable of erected and collapsed states;
the frame of structural elements comprising a pair of parallel base horizontal members each having connected thereto at opposite ends of the base members a pair of vertical members, such members being vertical when the frame is erected, each being pivotally connected to a corresponding end of the base horizontal members by a pivot having an axis such that the vertical members are permitted to pivot by endwise movement toward or away from the horizontal base members in the direction along the horizontal base members;

the frame further having a pair of oppositely disposed upper end horizontal members fixedly connected at outer ends to corresponding upper ends of the vertical members, the upper horizontal members each being mutually perpendicular to the lower end horizontal members, the vertical members at each end of the frame and the upper horizontal members affixed thereto defining oppositely disposed, parallel end walls;

provision to permit stabilizing or selective destabilizing of each of the pivots, and when the pivots are each stabilized, each of the vertical members extending upward perpendicularly from a corresponding end of the horizontal base members, the frame being then in upright, erected upright configuration for carrying contents;

the structural framework capable when erected being rectangular and having four upper corners and four lower corners and forming an exoskeleton of open panels for carrying materials of vessel-forming character to hold and protect products to be transported within the framework;

and the frame when the pivots are destabilized being capable of being collapsed into a folded space-conserving configuration for storage, return shipment or future use with the framework end panels selectively in either a (a) first folded configuration with the end panels folding inward and lying over and along the horizontal base members or (b) a second folded configuration with the framework end panels folding outward and extending outwardly from outer ends of the corresponding lower horizontal base members;

whereby in either folded relationship the frame occupies flat-folded space-conserving configuration;

the frame being adapted for carrying when erected flexible vessel-defining material for extending over and covering at least some of said panels so as to at least partly enclose contents within the frame when erected and to thereby protect products to be transported within the framework;

the vertical members and horizontal members defining when the framework is erected a plurality of windowed frame panels comprising the opposite end panels, and opposite side panels, the panels of the framework being joined at lower and upper corners defined by the upright structural elements;

the framework when erected providing a contents-receptive configuration of the shipper and protects the shipper and its contents against the stresses of filling, storage, distribution, merchandising and use of the packaging;

said provision to selectively stabilize or destabilize each of the pivots being at each of the four lower corners a stabilizer for each such corner selectively shiftable from a position of locking engagement with respective vertical and horizontal elements, so as to maintain the frame in an erected condition to a position of unlocking to permit the frame to fold into an unerected condition; and stacking structure atop the vertical members to engage a like reusable transport packaging apparatus next above the claimed reusable transport packaging apparatus for stacking thereof;

there being only two upper horizontal members and only two base horizontal members, the vertical members and the horizontal members being in mutually perpendicular relation when the frame is erected.

16. A reusable transport packaging apparatus of erectable-foldable character, characterized by:

the framework comprising a frame capable of erected and collapsed states;

the frame of structural elements comprising a pair of parallel base horizontal members each having connected thereto at opposite ends of the base members a pair of vertical members, such members being vertical when the frame is erected, each being pivotally connected to a corresponding end of the base horizontal members by a pivot having an axis such that the vertical members are permitted to pivot by endwise movement toward or away from the horizontal base members in the direction along the horizontal base members;

the frame further having a pair of oppositely disposed upper end horizontal members fixedly connected at outer ends to corresponding upper ends of the vertical members, the upper horizontal members each being mutually perpendicular to the lower end horizontal members, the vertical members at each end of the frame and the upper horizontal members affixed thereto defining oppositely disposed, parallel end walls;

provision to permit stabilizing or selective destabilizing of each of the pivots, and when the pivots are each stabilized, each of the vertical members extending upward perpendicularly from a corresponding end of the horizontal base members, the frame being then in upright, erected upright configuration for carrying contents;

the structural framework capable when erected being rectangular and having four upper corners and four lower corners and forming an exoskeleton of open panels for carrying materials of vessel-forming character to hold and protect products to be transported within the framework;

and the frame when the pivots are destabilized being capable of being collapsed into a folded space-conserving configuration for storage, return shipment or future use with the framework end panels selectively in either a (a) first folded configuration with the end panels folding inward and lying over and along the horizontal base members or (b) a second folded configuration with the framework end panels folding outward and extending outwardly from outer ends of the corresponding lower horizontal base members;

whereby in either folded relationship the frame occupies flat-folded space-conserving configuration;

the frame being adapted for carrying when erected flexible vessel-defining material for extending over and covering at least some of said panels so as to at least partly enclose contents within the frame when erected and to thereby protect products to be transported within the framework;

the vertical members and horizontal members defining when the framework is erected a plurality of windowed frame panels comprising the opposite end panels, and opposite side panels, the panels of the framework being joined at lower and upper corners defined by the upright structural elements;

the framework when erected providing a contents-receptive configuration of the shipper and protects the shipper and its contents against the stresses of filling, storage, distribution, merchandising and use of the packaging;

said provision to selectively stabilize or destabilize each of the pivots being at each of the four lower corners a stabilizer for each such corner selectively shiftable from a position of locking engagement with respective vertical and horizontal elements, so as to maintain the frame in an erected condition to a position of unlocking to permit the frame to fold into an unerected condition; and stacking structure atop the vertical members to engage a like reusable transport packaging apparatus next above the claimed reusable transport packaging apparatus for stacking thereof;

the vertical and horizontal members each being of multiply slot-apertured configuration along portions of their lengths, and the vertical members have a cross section characterized by a main web and a return web, and the return web does in turn have a return.

17. A reusable transport packaging apparatus of erectable-foldable character, characterized by:

the framework comprising a frame capable of erected and collapsed states;

the frame of structural elements comprising a pair of parallel base horizontal members each having connected thereto at opposite ends of the base members a pair of vertical members, such members being vertical when the frame is erected, each being pivotally connected to a corresponding end of the base horizontal members by a pivot having an axis such that the vertical members are permitted to pivot by endwise movement toward or away from the horizontal base members in the direction along the horizontal base members;

the frame further having a pair of oppositely disposed upper end horizontal members fixedly connected at outer ends to corresponding upper ends of the vertical members, the upper horizontal members each being mutually perpendicular to the lower end horizontal members, the vertical members at each end of the frame and the upper horizontal members affixed thereto defining oppositely disposed, parallel end walls;

provision to permit stabilizing or selective destabilizing of each of the pivots, and when the pivots are each stabilized, each of the vertical members extending upward perpendicularly from a corresponding end of the horizontal base members, the frame being then in upright, erected upright configuration for carrying contents;

the structural framework capable when erected being rectangular and having four upper corners and four lower corners and forming an exoskeleton of open panels for carrying materials of vessel-forming character to hold and protect products to be transported within the framework;

and the frame when the pivots are destabilized being capable of being collapsed into a folded space-conserving configuration for storage, return shipment or future use with the framework end panels selectively in either a (a) first folded configuration with the end panels folding inward and lying over and along the horizontal base members or (b) a second folded configuration with the framework end panels folding outward and extending outwardly from outer ends of the corresponding lower horizontal base members;

whereby in either folded relationship the frame occupies flat-folded space-conserving configuration;

the frame being adapted for carrying when erected flexible vessel-defining material for extending over and covering at least some of said panels so as to at least partly enclose contents within the frame when erected and to thereby protect products to be transported within the framework;

the vertical members and horizontal members defining when the framework is erected a plurality of windowed frame panels comprising the opposite end panels, and opposite side panels, the panels of the framework being joined at lower and upper corners defined by the upright structural elements;

the framework when erected providing a contents-receptive configuration of the shipper and protects the shipper and its contents against the stresses of filling, storage, distribution, merchandising and use of the packaging;

said provision to selectively stabilize or destabilize each of the pivots being at each of the four lower corners a stabilizer for each such corner selectively shiftable from a position of locking engagement with respective vertical and horizontal elements, so as to maintain the frame in an erected condition to a position of unlocking to permit the frame to fold into an unerected condition; and stacking structure atop the vertical members to engage a like reusable transport packaging apparatus next above the claimed reusable transport packaging apparatus for stacking thereof;

further characterized by a floor carried by the framework, the floor carrying beneath it a shock absorbing cushioning device interengaging the floor to provide protection of goods contained in the packaging apparatus.

18. A reusable transport packaging apparatus of erectable-foldable character, characterized by:

the framework comprising a frame capable of erected and collapsed states;

the frame of structural elements having a spaced pair of parallel base horizontal members each having connected thereto at opposite ends of the base members a pair of vertical members, such members being vertical when the frame is erected, each vertical being pivotally connected to a corresponding end of the base horizontal members by a pivot having an axis such that the vertical members are each permitted to pivot by endwise folding movement by pivoting relative to the horizontal base members in the direction along the horizontal base members;

the frame further having a pair of oppositely disposed upper end horizontal members fixedly connected at outer ends to corresponding upper ends of the vertical members, the upper horizontal members each being mutually perpendicular to the lower end horizontal members, the vertical members at each end of the frame and the upper horizontal members affixed thereto defining oppositely disposed, parallel end walls;

the pivots for each vertical member being capable of being stabilized or destabilized, and when destabilized each of the end walls each of the end walls being permitted to pivot by endwise movement for folding toward or away from the other end wall by pivoting relative to the horizontal base members in the direction along the horizontal base members;

gravity-responsive stabilizers slideably captive in each vertical member proximate each of the pivots to permit stabilizing or destabiliziiig of each of the pivots, and when the pivots are each stabilized, each of the vertical members extending upward perpendicularly from a corresponding end of the horizontal base members, the frame being then in upright, erected upright configuration for contents carrying;

each of the stabilizers movable to and then remaining in a stabilizing position in response to gravity when the frame is upright, for maintaining the frame in upright, erected condition, and each of the stabilizers movable out and then remaining out of its stabilizing position in response to gravity when the frame is turned over into an inverted condition, to permit collapse of the frame to a folded condition for storage, return shipment or future use with the framework;

the folded condition selectively being either a (a) first folded configuration with either end panel folding inward and lying over and along the horizontal base members or (b) a second folded configuration with either end panel folding outward and extending outwardly from outer ends of the corresponding lower horizontal base members;

whereby in the folded condition the frame occupies space-conserving configuration;

the vertical members and horizontal members defining when the framework is erected a plurality of windowed frame panels comprising the opposite end panels. and opposite side panels. the panels of the framework being joined at lower and upper corners defined by the upright structural elements;

the structural framework capable when erected having upper corners and lower corners and forming an exoskeleton of open panels for carrying at least one layer of nonstructural material of vessel-forming character to hold and protect products to be transported within the framework by extending over and covering at least some of said panels so as to at least partly enclose contents within the frame when erected and to thereby protect products to be transported within the framework;

stacking structure atop the vertical members to engage, when the framework is erected, a like reusable transport packaging apparatus next above the claimed reusable transport packaging apparatus for stacking thereof.

19. A reusable transport packaging apparatus as set forth in claim 18 wherein there are only two upper horizontal members and only two base horizontal members, the vertical members and the horizontal members being in mutually perpendicular relation when the framework is erected.

20. A reusable transport packaging apparatus as set forth in claim 18 wherein the stacking structure atop each of the vertical members comprises at upper corners of the apparatus a first tab diverging from one or more of the vertical members and extending upwardly therefrom, and a relatively smaller second tab near the first tab to be received by a corresponding vertical member of a next above like reusable transport packaging apparatus.

21. A reusable transport packaging, capable of being erected or folded, and when erected serving as a shipper for commercial packaging of goods, the packaging comprising:

a structural framework capable of carrying nonstructural material of vessel-forming character to hold and protect products to be transported within the framework;

the framework when erected provides contents-receptive configuration to protect the packing and its contents against the stresses of filling, storage, distribution, merchandising and use of the packaging;

the framework including a plurality of horizontal and vertical members, wherein the horizontal members define lengthwise structural elements and the vertical members define upright structural elements, when erected;

the horizontal and vertical members together defining an exoskeleton, when the framework is erected, having windowed frame panels of the framework joined pivotally at lower and fixedly/securely at upper corners defined by the upright structural elements;

at each of the lower corners there being a gravity-shiftable stabilizer slideably captive in the vertical member selectively securing the horizontal and vertical elements on each lower corner in stabilized, locked, relationship when the framework is erected, but the stabilizers each shiftable from stabilizing position in response to gravity when the erected framework is inverted to permit the framework to fold into or out of an unerected condition so it can be returned to a location for being refilled with contents, so as to be sustainably capable of reuse many times;

and stacking members atop the vertical members to provide for stacking/nesting and securement together of tiers of the transport package.

22. A reusable transport packaging as set forth in claim 1, further characterized by at least some vertical frame members being each provided with a series of apertures therein and further comprising in combination with the transport packaging apparatus and a link configured with flanges for securely engaging corresponding vertical members of adjacent units of transport packaging according to the foregoing, in side-by-side relationship for stabilizing interconnection.

* * * * *